United States Patent
Weber et al.

(10) Patent No.: US 8,988,776 B2
(45) Date of Patent: Mar. 24, 2015

(54) MULTILAYER OPTICAL FILM WITH OUTPUT CONFINEMENT IN BOTH POLAR AND AZIMUTHAL DIRECTIONS AND RELATED CONSTRUCTIONS

(75) Inventors: Michael F. Weber, Shoreview, MN (US); Timothy J. Nevitt, Red Wing, MN (US); Gilles J. Benoit, Minneapolis, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 682 days.

(21) Appl. No.: 13/129,455

(22) PCT Filed: Nov. 16, 2009

(86) PCT No.: PCT/US2009/064616
§ 371 (c)(1),
(2), (4) Date: May 16, 2011

(87) PCT Pub. No.: WO2010/059566
PCT Pub. Date: May 27, 2010

(65) Prior Publication Data
US 2011/0222295 A1 Sep. 15, 2011

Related U.S. Application Data

(60) Provisional application No. 61/116,291, filed on Nov. 19, 2008.

(51) Int. Cl.
*G02B 5/30* (2006.01)
*B32B 7/02* (2006.01)
*G02F 1/1335* (2006.01)

(52) U.S. Cl.
CPC . *G02B 5/305* (2013.01); *B32B 7/02* (2013.01); *G02F 1/13362* (2013.01); *G02F 1/133536* (2013.01); *G02F 2203/07* (2013.01)

USPC .............................. 359/489.01; 359/485.03

(58) Field of Classification Search
None
See application file for complete search history.

(56) References Cited

U.S. PATENT DOCUMENTS 3,069,974 A 12/1962 Marks
3,438,691 A 4/1969 Makas
(Continued)

FOREIGN PATENT DOCUMENTS

EP 597261 5/1994
WO WO 95-17303 6/1995
(Continued)

OTHER PUBLICATIONS

Benya, Advanced Lighting Guidelines, 13 pages.
(Continued)

*Primary Examiner* — Derek S Chapel
(74) *Attorney, Agent, or Firm* — Daniel J. Iden

(57) ABSTRACT

A film includes microlayers arranged into optical repeat units. Adjacent microlayers have in-plane refractive index mismatches $\Delta nx$, $\Delta ny$ tailored to provide mirror-like on-axis properties, such that the film has a reflectivity for normally incident light in an extended wavelength band of at least 75% for any polarization. Adjacent microlayers also have a refractive index mismatch $\Delta nz$ that provides the film with reduced reflectivity R1 and increased transmission for p-polarized light in the extended wavelength band incident on the film in a first plane of incidence at an angle θ oblique, where R1 is no more than half of the minimum of on-axis reflectivity. Further, $\Delta nx$ and $\Delta ny$ are different enough so that for light incident on the film in a second plane of incidence orthogonal to the first plane, the film has a reflectivity R2 of at least 75% for such light that is p-polarized and incident at any angle.

21 Claims, 14 Drawing Sheets

(56) References Cited

U.S. PATENT DOCUMENTS

| | | |
|---|---|---|
| 3,610,729 A | 10/1971 | Rogers |
| 3,829,680 A | 8/1974 | Jones |
| 4,218,727 A | 8/1980 | Shemitz |
| 4,247,498 A | 1/1981 | Castro |
| 4,446,305 A | 5/1984 | Rogers |
| 4,539,256 A | 9/1985 | Shipman |
| 4,726,989 A | 2/1988 | Mrozinski |
| 4,867,881 A | 9/1989 | Kinzer |
| 5,103,337 A | 4/1992 | Schrenk |
| 5,126,880 A | 6/1992 | Wheatley |
| 5,360,659 A | 11/1994 | Arends |
| 5,486,949 A | 1/1996 | Schrenk |
| 5,568,316 A | 10/1996 | Schrenk |
| 5,612,820 A | 3/1997 | Schrenk |
| 5,825,543 A | 10/1998 | Ouderkirk |
| 5,882,774 A | 3/1999 | Jonza |
| 5,976,686 A | 11/1999 | Kaytor |
| 6,057,961 A | 5/2000 | Allen |
| 6,080,467 A | 6/2000 | Weber |
| 6,157,490 A | 12/2000 | Wheatley |
| 6,243,199 B1 | 6/2001 | Hansen |
| 6,268,961 B1 | 7/2001 | Nevitt |
| 6,368,699 B1 | 4/2002 | Gilbert |
| 6,504,589 B1 | 1/2003 | Kashima |
| 6,531,230 B1 | 3/2003 | Weber |
| 6,565,982 B1 | 5/2003 | Ouderkirk |
| 6,738,349 B1 | 5/2004 | Cen |
| 6,783,349 B2 | 8/2004 | Neavin |
| 6,811,274 B2 | 11/2004 | Olczak |
| 2002/0021387 A1 | 2/2002 | Larson |
| 2003/0165060 A1 | 9/2003 | Ouderkirk |
| 2003/0227678 A1 | 12/2003 | Lines |
| 2004/0135742 A1 | 7/2004 | Weber |
| 2004/0150997 A1 | 8/2004 | Ouderkirk |
| 2005/0001537 A1 | 1/2005 | West |
| 2006/0091412 A1 | 5/2006 | Wheatley |
| 2007/0091230 A1 | 4/2007 | Ouderkirk |
| 2007/0177272 A1 | 8/2007 | Benson |
| 2007/0177273 A1 | 8/2007 | Benson |
| 2008/0037127 A1 | 2/2008 | Weber |
| 2008/0075948 A1 | 3/2008 | Padiyath |
| 2008/0291361 A1 | 11/2008 | Weber |
| 2010/0156953 A1 | 6/2010 | Nevitt |
| 2010/0165660 A1 | 7/2010 | Weber |
| 2010/0214762 A1 | 8/2010 | Nevitt |

FOREIGN PATENT DOCUMENTS

| | | |
|---|---|---|
| WO | WO 99-36258 | 7/1999 |
| WO | WO 99-36809 | 7/1999 |
| WO | WO 99-39224 | 8/1999 |
| WO | WO 02-096621 | 12/2002 |
| WO | WO 2007/002341 A1 | 1/2007 |
| WO | WO 2008-144136 | 11/2008 |
| WO | WO 2008-144644 | 11/2008 |
| WO | WO 2008-144656 | 11/2008 |
| WO | WO 2009-123928 | 10/2009 |
| WO | WO 2010-059568 | 5/2010 |
| WO | WO 2010-059579 | 5/2010 |
| WO | WO 2010-059614 | 5/2010 |
| WO | WO 2011-062822 | 5/2011 |

OTHER PUBLICATIONS

Gendron, "Foaming Poly(methyl Methacrylate) with an Equilibrium Mixture of Carbon Dioxide and Isopropanol", Journal of Cellular Plastics, Mar. 2004, vol. 40, No. 2, pp. 111-130.
Weber, "Giant Birefringent Optics in Multilayer Polymer Mirrors", Science, Mar. 31, 2000, vol. 287, pp. 2451-2456. (XP000990141).
Intl Search Report for PCT/US2009/064616, 6 pages.
Written Opinion for PCT/US2009/064616, 13 pages.
Intl Search Report for PCT/US2009/064628, 3 pages.
Written Opinion for PCT/US2009/064628, 7 pages.
Intl Search Report for PCT/US2009/064674, 8 pages.
Written Opinion for PCT/US2009/064674, 13 pages.
Intl Search Report for PCT/US2009/064770, 3 pages.
Written Opinion for PCT/US2009/064770, 7 pages.

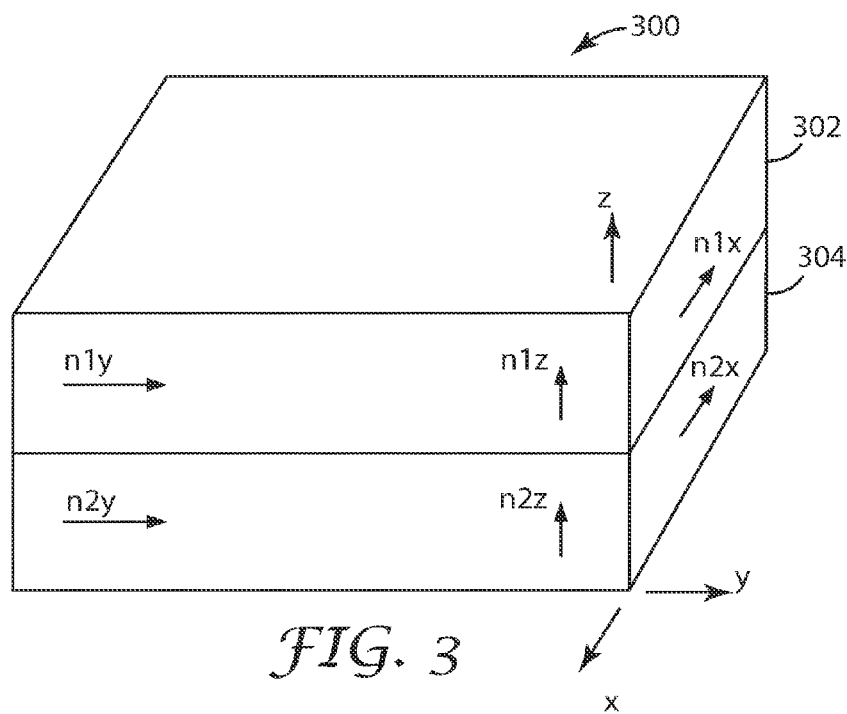
FIG. 3
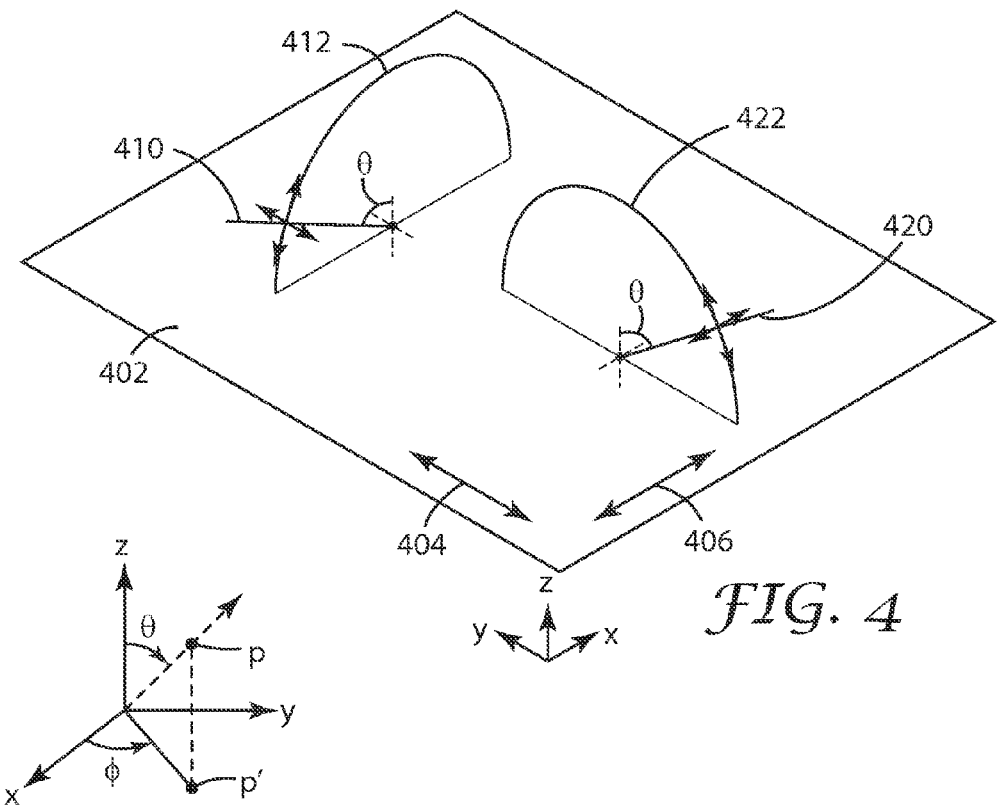
FIG. 4
FIG. 4a

ND AZIMUTHAL DIRECTIONS AND
MULTILAYER OPTICAL FILM WITH OUTPUT CONFINEMENT IN BOTH POLAR AND AZIMUTHAL DIRECTIONS AND RELATED CONSTRUCTIONS

CROSS REFERENCE TO RELATED APPLICATIONS

This application is a national stage filing under 35 U.S.C. 371 of PCT/US2009/064616, filed on Nov. 16, 2009, which claims priority to U.S. Provisional Application No. 61/116,291, filed on Nov. 19, 2008, the disclosure of which is incorporated by reference in its/their entirety herein.

FIELD OF THE INVENTION

This invention relates generally to optical films, with particular application to such films whose reflection characteristics are determined in large part by constructive and destructive interference of light reflected from interfaces between microlayers within the film. The invention also relates to associated systems and methods.

BACKGROUND

Multilayer optical films, whose reflection and transmission characteristics are based exclusively or predominantly on constructive and destructive interference of light reflected from interfaces between a plurality or stack of optically thin layers ("microlayers") within the film, are known. For example, it has long been known to make high reflectivity mirror films by vacuum deposition of alternating layers of inorganic optical materials, such as titanium dioxide ($TiO_2$) and silicon dioxide ($SiO_2$), onto a substrate.

It is also known to provide multilayer optical films with significant in-plane birefringence by coextruding a plurality of alternating polymer layers and stretching the cast web under conditions suitable to thin the cast layers and provide some of the resulting microlayers with stress-induced birefringence. See, e.g., U.S. Pat. Nos. 3,610,729 (Rogers), 4,446,305 (Rogers et al.), and 5,486,949 (Schrenk et al.). The material properties and process conditions are selected so that the stress-induced birefringence provides a refractive index mismatch between adjacent microlayers along one in-plane axis, and a substantial refractive index match along an orthogonal in-plane axis. The index mismatch provides high reflectivity for light polarized along the first axis (block axis), and the index match provides low reflectivity and high transmission for light polarized along the orthogonal axis (pass axis), resulting in a convenient reflective polarizer article.

Recently, researchers from 3M Company have pointed out the significance of layer-to-layer refractive index characteristics of such films along the direction perpendicular to the film, i.e. the z-axis, and shown how these characteristics play an important role in the reflectivity and transmission of the films at oblique angles of incidence. See, e.g., U.S. Pat. No. 5,882,774 (Jonza et al.). Jonza et al. teach, among other things, how a z-axis mismatch in refractive index between adjacent microlayers, more briefly termed the z-index mismatch or $\Delta n_z$, can be tailored to allow the construction of multilayer stacks for which the Brewster angle (the angle at which reflectance of p-polarized light at an interface goes to zero) is very large or is nonexistent. This in turn allows for the construction of multilayer mirrors and polarizers whose interfacial reflectivity for p-polarized light decreases slowly with increasing angle of incidence, or is independent of angle of incidence, or increases with angle of incidence away from the normal direction. As a result, multilayer films having high reflectivity for both s- and p-polarized light for any incident direction in the case of mirrors, and for the selected direction in the case of polarizers, over a wide bandwidth, can be achieved.

BRIEF SUMMARY

We have discovered new combinations of material properties that can be used to provide multilayer optical films that exhibit reflectivity and transmission characteristics as a function of direction and polarization never before demonstrated. For example, multilayer films are described herein that exhibit mirror-like properties for normal incidence light, maintaining high reflectivity (e.g. at least 75%, 80%, 85%, or 90%) for any polarization and over the visible range or other extended wavelength range. At certain oblique angles, however, these same films become highly transmissive for p-polarized light over the extended wavelength range, but this selective transmission is directionally asymmetric in that it occurs in one plane of incidence but not in an orthogonal plane of incidence. The result is an azimuthally asymmetric "batwing" transmission characteristic with normal incidence mirror-like properties in a single, flat, and preferably coextrudable multilayer optical film without the need for any prismatic or holographic layer or film, or any similar surface structure, and without the need for any additional light management films or components. Stated differently, single, flat, coextrudable multilayer optical films are described that, by virtue of the directional dependence of their transmission and reflectivity, substantially confine transmitted light into two directional lobes each of which has a finite angular width in both polar angle and azimuthal angle.

This combination of features is counterintuitive, since ordinarily one would expect a multilayer optical film that is a good mirror at normal incidence, strongly reflecting light of all polarizations, to have off-axis reflection and transmission properties that are substantially rotationally invariant about the z-axis. For example, if such a film maintains strong reflectivity at oblique polar angles for light incident in one plane characterized by a first azimuthal angle or direction, one would expect substantially the same strong reflectivity at those same oblique polar angles as the plane of incidence is rotated to any other azimuthal angle. Similarly, if the film drops in reflectivity at oblique polar angles for light incident in the one plane characterized by the first azimuthal angle, one would expect substantially the same drop in reflectivity at those same oblique polar angles as the plane of incidence is rotated to any other azimuthal angle.

We describe herein, among other things, a multilayer optical film that includes microlayers arranged into optical repeat units for reflecting light over an extended wavelength band such as the human-visible spectrum from 400 to 700 nm. Adjacent microlayers exhibit substantial in-plane refractive index mismatches $\Delta n_x$ along an x-axis and $\Delta n_y$ along a y-axis. These mismatches are sufficiently large in magnitude so that for normally incident light in the extended wavelength band, the film has a reflectivity Rnormalx for such light polarized along the x-axis and a reflectivity Rnormaly for such light polarized along the y-axis, and Rnormalx and Rnormaly are both at least 75%, 80%, 85%, or 90%. Adjacent microlayers also however exhibit a substantial refractive index mismatch $\Delta n_z$ along an out-of-plane z-axis. This mismatch is sufficiently large in magnitude and of appropriate polarity so that for light in the extended wavelength band incident on the film in a first plane of incidence, the film has a reflectivity R1 of no more than half of the lesser of Rnormalx and Rnormaly (referred to as "Rnormalmin") for such light that is p-polarized and incident at an angle θoblique. However, the in-plane refractive index mismatches Δnx and Δny are different enough so that for light in the extended wavelength band incident on the film in a second plane of incidence orthogonal to the first plane of incidence, the film has a reflectivity R2 of at least 75% for such light that is p-polarized, for all angles of incidence. Thus, the large decrease in p-pol reflectivity—and the accompanying large increase in transmission—observed in the first plane of incidence at oblique polar angles is not observed in the second plane of incidence.

Such a film typically exhibits the low reflectivity R1 in two distinct directions, each of which lies in the first plane of incidence and each of which subtends a polar angle θoblique relative to the z-axis, and the two directions are angularly separated from each other by twice that angle, 2*θoblique. The low reflectivity and high transmission associated with each of these unique directions is maintained over a limited cone of directions beyond which the high reflectivity and low transmission associated with the normally incident light or with the light incident in the second plane of incidence takes over, such cones being referred to as transmission lobes. Thus, such a film can "confine" light by selectively transmitting light into two off-axis transmission lobes forming a batwing distribution, and reflecting light that is not transmitted. Each lobe of the batwing can be characterized by a finite angular width Δθ in polar angle θ and a finite angular width Δφ in azimuthal angle φ.

The off-axis light leakage makes the film suitable for use in direct-lit backlights and similar lighting systems in which the film can be placed in front of the lamp(s), with or without other intermediate optical films or bodies, in order to help disperse light emitted by the lamp(s) for better spatial uniformity and to help hide or obscure the lamp(s). The film can also be used in general illumination systems such as luminaires and task lighting to provide a balance of on-axis and off-axis illumination to help broaden the angular distribution of the output light for reduced glare or other desired design objectives. Prismatic films and similar light management films can also be included to redirect highly oblique light exiting the multilayer optical film towards the viewing axis of the system or in other directions as desired.

Because of the asymmetric nature of the light leakage, and the limited range of azimuthal angles associated with the transmission lobes, the film is well suited for use with linear light sources, i.e., a light source that extends physically along a light source axis and is much shorter or confined along other axes perpendicular to the light source axis. A straight tubular fluorescent bulb is one example of such a source, and a plurality of individual LEDs arranged in a line is another example. The film can be beneficially oriented such that the first plane of incidence, along which the transmission lobes are aligned, is substantially perpendicular to the light source axis. The first plane of incidence can alternatively be aligned parallel to the light source axis. In this alternative configuration, much of the light undergoes multiple reflections in order to be redirected to exit along the weak axis, resulting in a more uniform mixing of the light before exiting through the film. A low absorption system is important in this case so as to maintain a high efficiency system.

The disclosed reflective films can be made to have low absorption losses in the visible region or other wavelength region of interest, so that nearly all such light that is not transmitted by the film is reflected by the film, and vice versa, or Rhemi+Themi≈100%, where Rhemi refers to the total hemispherical averaged reflectivity of the film, and Themi refers to the total hemispherical averaged transmissivity of the film. As such, the disclosed films can advantageously be used in lighting systems that employ light recycling. A disclosed film may for example be placed in a direct-lit system with a back reflector and one or more lamps disposed between the back reflector and the film. Light that is not initially transmitted by the film can be reflected by the back reflector back towards the film for another opportunity to be transmitted.

The reflectivity and transmission values referred to herein as being associated with the multilayer optical film can be construed to incorporate the effects of two, or one, or zero film/air interfaces, unless otherwise noted. The question of how many such film/air interfaces to include may depend on the intended application of the disclosed reflective films. For example, if the film is to be placed in an existing backlight, luminaire, or other lighting system, and if the outer major surfaces of the film will remain exposed to air rather than be brought into close optical contact (e.g. by lamination) with another optical element, then the system designer may wish to include the effects of both film/air interfaces in reflectivity and transmission to assess the impact of the reflective film on the system. On the other hand, if a prismatic film is first laminated to one major surface of the reflective film and then the combination is placed in an existing lighting system, then the system designer may wish to include the effects of only one film/air interface—that of the unlaminated major surface of the reflective film. Finally, if the reflective film is to be laminated to an existing component of a lighting system, the existing component having a refractive index similar to that of the outer surfaces of the film, the system designer may wish to include no film/air interfaces in the reflectivity and transmission values in view of the fact that the addition of the reflective film to the system leaves the overall number of polymer/air interfaces in the system substantially unchanged.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

FIG. 3 is a perspective view of a portion of a multilayer optical film;

FIG. 4 is a perspective view of an ideal polarizing film, demonstrating the difference between a fixed x, y, z Cartesian coordinate system on the one hand and s- and p-polarization directions on the other hand, the latter of which are dependent on the plane of incidence of the light and thus unspecified with respect to the x, y, and z axes unless one specifies the plane of incidence of the light;

FIG. 4a is a perspective view of the Cartesian coordinate axes x, y, z, showing with respect thereto the polar angle θ and the azimuthal angle φ of an arbitrary point or vector;

In the figures, like reference numerals designate like elements.

DETAILED DESCRIPTION OF ILLUSTRATIVE EMBODIMENTS

Figure 1:
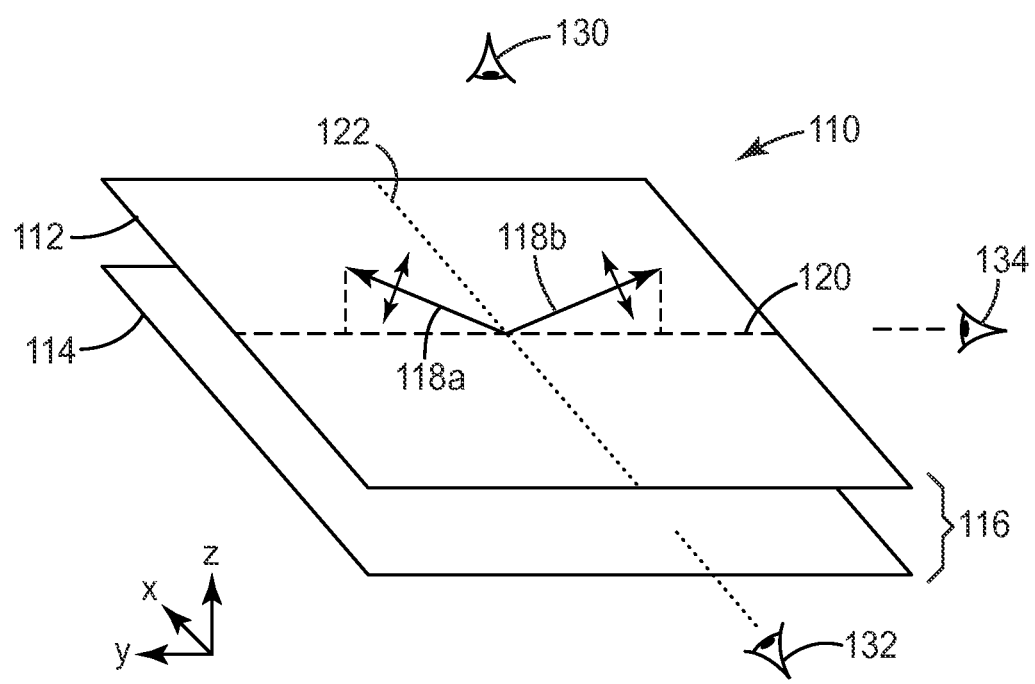
FIG. 1 is a schematic perspective view of a lighting system that includes a multilayer optical film that has the batwing transmission characteristic described herein.

FIG. 1 depicts a simplified perspective view of a lighting system 110 that utilizes a reflective multilayer optical film 112 having a batwing transmission characteristic. The system 110 also includes a high reflectivity back reflector 114 which is substantially coextensive with and opposed to multilayer optical film 112 so as to form a light recycling cavity 116 therebetween. Thus, light reflected by the film 112 can be reflected again by back reflector 114 towards the film 112 for another opportunity to be transmitted for improved system efficiency and reduced losses.

The multilayer optical film 112 is shown transmitting light only at large oblique angles, see rays 118a, 118b. These rays 118a-b are an oversimplification of the actual transmission of actual multilayer optical films described further below, but are useful to demonstrate the important characteristics of the films. Small double-sided arrows are included with the depicted rays to represent their respective polarization states. Also, a Cartesian x-y-z coordinate system is shown for reference purposes. Film 112 is depicted as substantially flat and planar, extending parallel to the x-y plane and having a surface normal parallel to the z-axis. Lighting systems are also contemplated in which the film 112 may be curved or bent to conform to a desired shape, but even in those cases the film 112 can be considered to be locally flat and planar over small areas. In such cases, FIG. 1 may be considered to represent a small localized portion of a larger lighting system.

The multilayer optical film 112 possesses two characteristic in-plane axes 120, 122 which we have aligned with the y- and x-axes, respectively, of the coordinate system, although of course other conventions are possible. The axis 120 can be referred to as a "weak" axis and axis 122 can be referred to as a "strong" axis. The weak and strong axes are analogous to a "pass" and "block" axis, respectively, of a polarizer, but for highly oblique light and not necessarily for on-axis light. On-axis light, impinging on the film 112 parallel to the z-axis, is strongly reflected over an extended wavelength band regardless of polarization, such that the film 112 behaves substantially as a highly reflective broadband mirror. The reflectivity of such light polarized along the x-axis, or Rnormalx, is at least 75%, or at least 80%, 85%, or 90%, and the reflectivity of such light polarized along the y-axis, Rnormaly, is also at least 75, 80, 85, or 90%. In many of the embodiments, the on-axis reflectivity of the weak axis 120 is somewhat less than that of the strong axis 122, but this need not be the case in every embodiment, and in any event the weak axis reflectivity is at least 75% as stated above. Stated differently, if Rnormalmin is the lesser of Rnormalx and Rnormaly, then Rnormalmin will correspond to the weak axis in many but not all embodiments, and Rnormalmin is at least 75, 80, 85, or 90%. Because of the mirror-like characteristic of the film 112 at normal incidence, FIG. 1 shows no ray transmitted through the film along the z-axis.

At large oblique angles, the film 112 becomes strongly transmitting, but substantially only for p-polarized light, and then selectively for such p-polarized light incident in a "weak plane" (a plane of incidence containing the weak axis 120) and not for p-polarized light incident in a "strong plane" (a plane of incidence containing the strong axis 122). Oblique rays 118a, 118b are thus shown in FIG. 1 as lying in the weak (y-z) plane, and are shown as p-polarized. The increase in transmission is accompanied by a drop in reflectivity relative to normal incidence. Reflectivity for p-polarized light incident in the weak plane drops to half of the minimum in-plane reflectivity Rnormalmin at least some incidence angle(s) θoblique, and preferably drops even lower. This can be expressed as R1≤Rnormalmin/2, where R1 refers to the reflectivity of p-polarized light incident in the weak plane at the angle θoblique. θoblique is typically in a range from 50 to 80 degrees in air. Reflectivity for p-polarized light incident in the strong plane remains high for all angles of incidence. This can be expressed as R2≥75% (or 80, 85, or 90%), where R2 refers to the reflectivity of p-polarized light incident in the strong plane at any angle (over all possible angles of incidence). Alternately, R2 can be greater than or equal to Rnormalmin for all incidence angles θ.

The reflectance and transmission performance of film 112 in planes of incidence intermediate the weak plane and block plane, corresponding to azimuthal angles greater than 0 but less than 90 degrees, characterizes the degree of collimation or angular confinement of the transmitted light and is discussed further below.

The increase in transmission for light incident in the weak or y-z plane, combined with the fact that a corresponding increase in transmission does not occur for light incident in the strong or x-z plane, can be used beneficially in different lighting systems such as backlights, luminaires, and the like, for bulb-hiding purposes or to otherwise distribute light into desirable directional and spatial patterns. With such optical characteristics, the multilayer optical film can provide a flux or brightness leveling along only one direction, the weak axis 120, which can be used beneficially in lighting systems that employ linear light sources such as fluorescent tubes or rows of closely spaced LED or phosphor coated LEDs. In such cases, the flux-leveling direction of the film is preferably oriented to be substantially perpendicular to the axis or long dimension of the linear light source. The angle-dependent reflectivity and transmission of the film can help provide a more uniform delivery of light intensity to, for example, a front diffuser plate of a backlight or luminaire.

The foregoing properties of multilayer optical film 112 can be achieved by appropriate selection and design of a large plurality of microlayers as described in more detail below. Preferably, the microlayers and other components of the film are fabricated using low absorption materials such as low loss light transmissive polymers or other low loss materials, so that single pass absorption losses for the film are kept very low, e.g. less than 1% average over visible wavelengths. Thus, unless otherwise noted, the sum of the percent reflection and the percent transmission of a multilayer optical film, for a given wavelength, polarization state, and incidence direction, can be assumed to be nearly 100%, or at least 99%. In other words, reflectivity (%)+transmission (%)≈100%. For this reason, a decrease in reflectivity of the film can also be construed as an increase in transmission, and vice versa.

The reader who is familiar with the basic characteristics of multilayer optical films will know that a given pair of microlayers within the multilayer optical film will reflect different wavelengths of light as a function of the incidence angle of the light, and this is also the case for the multilayer optical films described herein. In some cases this property is exploited to construct "color-shifting" films that intentionally transmit or reflect different wavelengths as a function of incidence angle. However, the multilayer optical films described herein are designed to reflect and transmit light substantially uniformly over an extended wavelength band such as the human visible region from 400-700 nm, and are designed to do so over a wide range of incidence angles. This can be accomplished by providing the film 112 with a sufficient number of microlayers and a suitable layer thickness gradient, as discussed further below, to provide a wide and substantially flat reflection band. The reflection band is desirably wide enough and flat enough so that as it shifts with incidence angle and polarization, a relatively flat or uniform spectral transmission and reflectivity is maintained over the extended wavelength band. The flat spectral characteristic ensures that white light is reflected or transmitted uniformly, so that the perceived color of the reflected and transmitted light does not deviate too much from the color of the source. Where the extended wavelength band of interest is the visible spectrum, providing the multilayer optical film with a flat reflection band at normal incidence from 400 to 900 nm is often adequate, assuming the film has flat major surfaces exposed to air, to ensure uniform reflectivity from 400-700 nm over all useable angles.

The system 110 also includes the back reflector 114, but the reader will understand that the multilayer optical film 112 can also be used in lighting systems that contain no back reflector 114 and no recycling cavity 116. When included, however, the back reflector 114 may take a variety of forms depending on the intended application. In the case of a relatively inexpensive luminaire design, the back reflector may be or comprise a simple coating of white paint applied to a structural member such as a piece of sheet metal. In more demanding applications such as a backlight for an LCD TV or similar display, the back reflector 114 may have an on-axis average reflectivity of at least 90%, 95%, 98%, 99%, or more for visible light of any polarization. Such reflectivity values encompass all visible light reflected into a hemisphere, i.e., such values include both specular and diffuse reflections. In this regard, the back reflector 114 can be a predominantly specular, diffuse, or combination specular/diffuse reflector, whether spatially uniform or patterned. The back reflector 114 can also be or comprise a semi-specular reflector as described in PCT Patent Application Publication WO 2008/144644, "Recycling Backlights With Semi-Specular Components", filed on May 19, 2008 and incorporated herein by reference.

In some cases, the back reflector 114 can be made from a stiff metal substrate with a high reflectivity coating, or a high reflectivity film laminated to a supporting substrate. Suitable high reflectivity materials include Vikuiti™ Enhanced Specular Reflector (ESR) multilayer polymeric film available from 3M Company; a film made by laminating a barium sulfate-loaded polyethylene terephthalate film (2 mils thick) to Vikuiti™ ESR film using a 0.4 mil thick isooctylacrylate acrylic acid pressure sensitive adhesive, the resulting laminate film referred to herein as "EDR II" film; E-60 series Lumirror™ polyester film available from Toray Industries, Inc.; porous polytetrafluoroethylene (PTFE) films, such as those available from W. L. Gore & Associates, Inc.; Spectralon™ reflectance material available from Labsphere, Inc.; Miro™ anodized aluminum films (including Miro™ 2 film) available from Alanod Aluminum-Veredlung GmbH & Co.; MCPET high reflectivity foamed sheeting from Furukawa Electric Co., Ltd.; White Refstar™ films and MT films available from Mitsui Chemicals, Inc.; and one or more porous polypropylene films made using thermally induced phase separation ("TIPS"), described in U.S. Pat. No. 5,976,686 (Kaytor et al.).

The back reflector 114 can be substantially flat and smooth, or it may have a structured surface associated with it to enhance light scattering or mixing. Such a structured surface can be imparted (a) on the surface of the back reflector 114, or (b) on a transparent coating applied to the surface. In the former case, a highly reflecting film may be laminated to a substrate in which a structured surface was previously formed, or a highly reflecting film may be laminated to a flat substrate (such as a thin metal sheet, as with Vikuiti™ Durable Enhanced Specular Reflector-Metal (DESR-M) reflector available from 3M Company) followed by forming the structured surface, such as with a stamping operation. In the latter case, a transparent film having a structured surface can be laminated to a flat reflective surface, or a transparent film can be applied to the reflector and then afterwards a structured surface can be imparted to the top of the transparent film.

For those embodiments that include a direct-lit configuration, i.e., a configuration in which one or more light sources are disposed directly behind the output or emitting area of the lighting system 110, the back reflector can be a continuous unitary and unbroken layer on which the light source(s) are mounted, or it can be constructed discontinuously in separate pieces, or discontinuously insofar as it includes isolated apertures, through which light sources can protrude, in an otherwise continuous layer. For example, strips of reflective material can be applied to a substrate on which rows of light sources are mounted, each strip having a width sufficient to extend from one row of light sources to another and having a length dimension sufficient to span between opposed borders of the backlight's output area.

Lighting system 110 also includes one or more light sources, not shown in the view of FIG. 1, that are disposed to emit light into the recycling cavity. The light sources may emit light over an extended wavelength band of interest, typically, the visible spectrum, or may emit a narrow band of ultraviolet, visibly colored, or infrared light such as from an LED or a laser. Cold cathode fluorescent lamps (CCFLs), for example, provide white light emission over their long narrow emissive areas, and those emissive areas can also operate to scatter some light impinging on the CCFL, such as would occur in a recycling cavity. The typical emission from a CCFL has an angular distribution that is substantially Lambertian, which may be inefficient or otherwise undesirable in some ultra low loss backlight designs. Also, the emissive surface of a CCFL, although somewhat diffusely reflective, also typically has an absorptive loss that may be excessive in such applications. On the other hand, fluorescent light sources are perfectly adequate in higher loss systems such as overhead luminaires or task lighting.

Light emitting diodes (LEDs) are also suitable for use as the light source(s). An LED die emits light in a near-Lambertian manner, but because of its much smaller size relative to CCFLs, the LED light distribution can be readily modified, e.g., with an integral encapsulant lens, reflector, or extractor to make the resulting packaged LED a forward-emitter, a side-emitter, or other non-Lambertian profile, which may be beneficial in some applications. However, the smaller size and higher intensity of LED sources relative to CCFLs can also make it more difficult to produce a spatially uniform backlight output using LEDs. This is particularly true in cases where individually colored LEDs, such as arrangements of red/green/blue (RGB) LEDs, are used to produce white light, since failure to provide adequate lateral transport or mixing of such light can result in undesirable colored bands or areas. White light emitting LEDs, in which a phosphor is excited by a blue or UV-emitting LED die to produce intense white light from a small area or volume on the order of an LED die, can be used to reduce such color non-uniformity. But white LEDs currently are unable to provide LCD color gamuts as wide as those achievable with individual colored LED arrangements and thus may not be desirable for all end-use applications.

Alternatively, white light can be generated from a blue or UV LED, or in general any longer wavelength light from a shorter wavelength source, by adding a phosphor in a location apart from the LED in or on a light recycling cavity which utilizes the films of this invention for directional light control or light mixing. This arrangement is sometimes referred to as a "remote phosphor".

Whichever light sources are used, they may be positioned directly behind the extended output surface of the system 110, i.e., directly behind the multilayer optical film 112, or may be positioned along the edge of the output surface. The former case is referred to as a "direct-lit" system, and the latter is an "edge-lit" system. In some cases, a direct-lit system may also include one or some light sources at the periphery of the device, or an edge-lit system may include one or some light sources directly behind the output area. In such cases, the system can be considered to be "direct-lit" if most of the light originates from directly behind the output area, and "edge-lit" if most of the light originates from the periphery of the output area. Direct-lit systems are susceptible to the phenomenon of "punchthrough", where a bright spot appears in the output area above each source. Edge-lit systems typically include a solid light guide that carries or guides light from the edge-mounted light source to all portions of the output area, the light guide also having light extraction features to direct light out of the light guide towards a viewer 130. If the system 110 is a backlight for a liquid crystal display (LCD) device, then additional components would typically be included between the film 112 and the viewer 130, such as one or more polarizers (including absorbing polarizers and reflecting polarizers), diffusers, prismatic films (including any of the Brightness Enhancement Films (BEF) available from 3M Company and including available turning films), and a liquid crystal panel. If the system is simpler, such as an overhead luminaire or a task light, then additional components may include a diffuser film or panel, and/or other rigid light-transmissive panel to which the disclosed multilayer optical film may be laminated or against which the disclosed multilayer optical film may be placed.

Turning again to FIG. 1, observers 132 and 134 are also shown for reference purposes to further demonstrate the fundamental optical characteristics of the multilayer optical film 112. Observer 132 looks along the strong axis 122, and sees lighting system 110 as shown in the partial schematic side view of FIG. 2a. Observer 134 looks along the weak axis 120, and sees lighting system 110 as shown in the partial schematic side view of FIG. 2b.

Figure 2A:
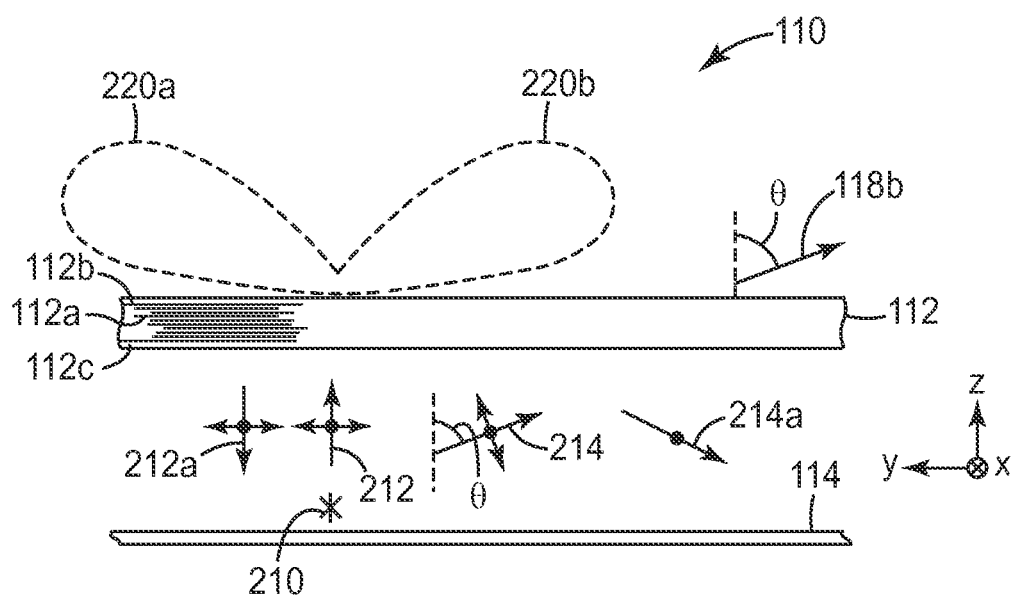
FIGS. 2a and 2b are schematic side views of the lighting system of FIG. 1 along orthogonal viewing directions.

In FIG. 2a, a generic light source 210 is shown disposed between film 112 and back reflector 114 in a direct-lit configuration, directly behind the output surface of the lighting system. The light source 210 is shown to emit two unpolarized light rays: normally incident ray 212, and obliquely incident ray 214 which lies in the y-z (weak) plane and subtends a polar angle $\theta$ relative to the surface normal or z-axis. These rays impinge upon the rear major surface of multilayer optical film 112, which film is now depicted with some of its constituent components including a stack of microlayers 112a and (optional) optically thick outer skin layers 112b, 112c, which are not intended to be drawn to scale. These constituent components are shown for convenience over only a portion of the film 112 but will be understood to extend across the entire length and width of the film 112. With appropriate design of the film 112, the film operates as an on-axis mirror by strongly reflecting both orthogonal polarizations, reflecting them back towards the back reflector 114 as ray 212a. The film 112 is also tailored to provide a selective off-axis leak for light polarized in the y-z or weak plane, whereby such light impinging normally on the film is strongly reflected (see rays 212, 212a), but such light impinging at a highly oblique polar angle $\theta$ (see the portion of ray 214 polarized in the plane of the drawing) is strongly transmitted as ray 118b, seen earlier in FIG. 1. The portion of oblique ray 214 polarized along the x- or strong axis 122 is strongly reflected by the film 112 to produce ray 214a.

A polar angle flux envelope 220 (labeled by its separate halves or lobes 220a, 220b) is provided in FIG. 2a to depict qualitatively the angular dependence of the transmission of the film 112 for p-polarized light incident in the y-z or weak plane. This envelope can be considered to represent the flux or brightness of light transmitted by the film 112, or alternatively the percent transmission of the film 112, as a function of polar angle $\theta$ for light of the specified polarization in the specified plane of incidence. A similar flux envelope for the orthogonal polarization, s-polarized light, incident in the weak plane is not shown, because the very small transmission of such light at all angles makes such an envelope uninteresting and unnecessary. The p-pol envelope 220 shows, however, that the p-polarized light has a small or negligible transmission at normal incidence, which increases to a maximum at a large oblique angle θoblique. This angle of maximum transmission also corresponds to a minimum in reflectivity (R1) mentioned above. If the transmission and reflectivity values include the effects of one or two film/air surface reflections, the transmission of the p-polarized light will typically rapidly decline between the angle θoblique and grazing incidence (θ=90 degrees), as shown by flux envelope 220. The result is a batwing transmission characteristic for p-polarized light incident in the weak plane, with on-axis mirror-like characteristics (high on-axis reflectivity) for all polarizations. The lobes 220a, 220b typically exhibit axial symmetrical with respect to the z-axis, and exhibit mirror symmetry with respect to the y-z plane.

Figure 2B:
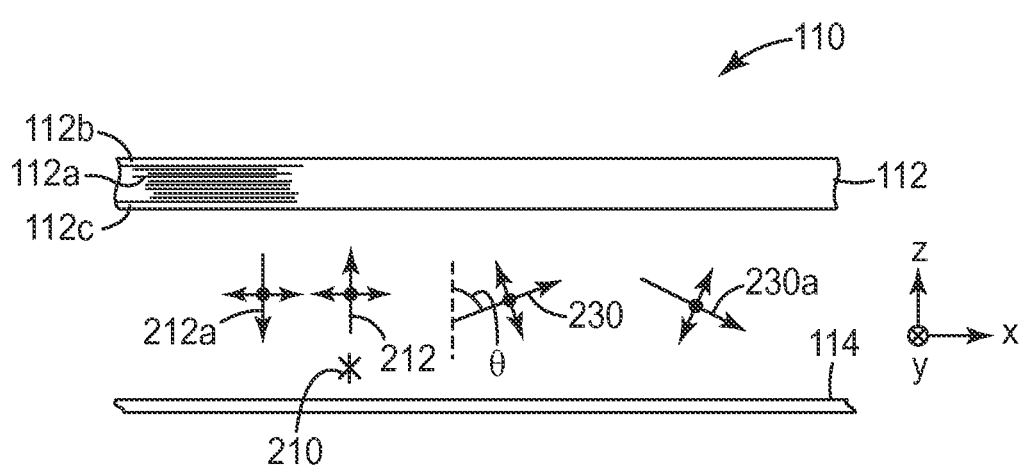

FIG. 2b is similar to FIG. 2a but for the observer 134 who looks along the y-axis or weak axis 120. This observer also sees the light source 210 emitting normally incident ray 212, which is again strongly reflected for both orthogonal polarizations to produce reflected ray 212a as described previously. Source 210 also emits another oblique ray 230, which subtends an angle θ relative to the surface normal or z-axis like ray 214 of FIG. 2a, but unlike that ray is disposed in the orthogonal x-z plane, the "strong" plane. In this plane of incidence, both polarization states of the ray 230 are strongly reflected at the oblique angle, yielding reflected ray 230a. No polar flux envelopes are shown in this figure because the very small transmission of light incident in the strong plane, for both orthogonal polarizations and at all incidence angles, makes such envelopes uninteresting and unnecessary.

Figure 2C:
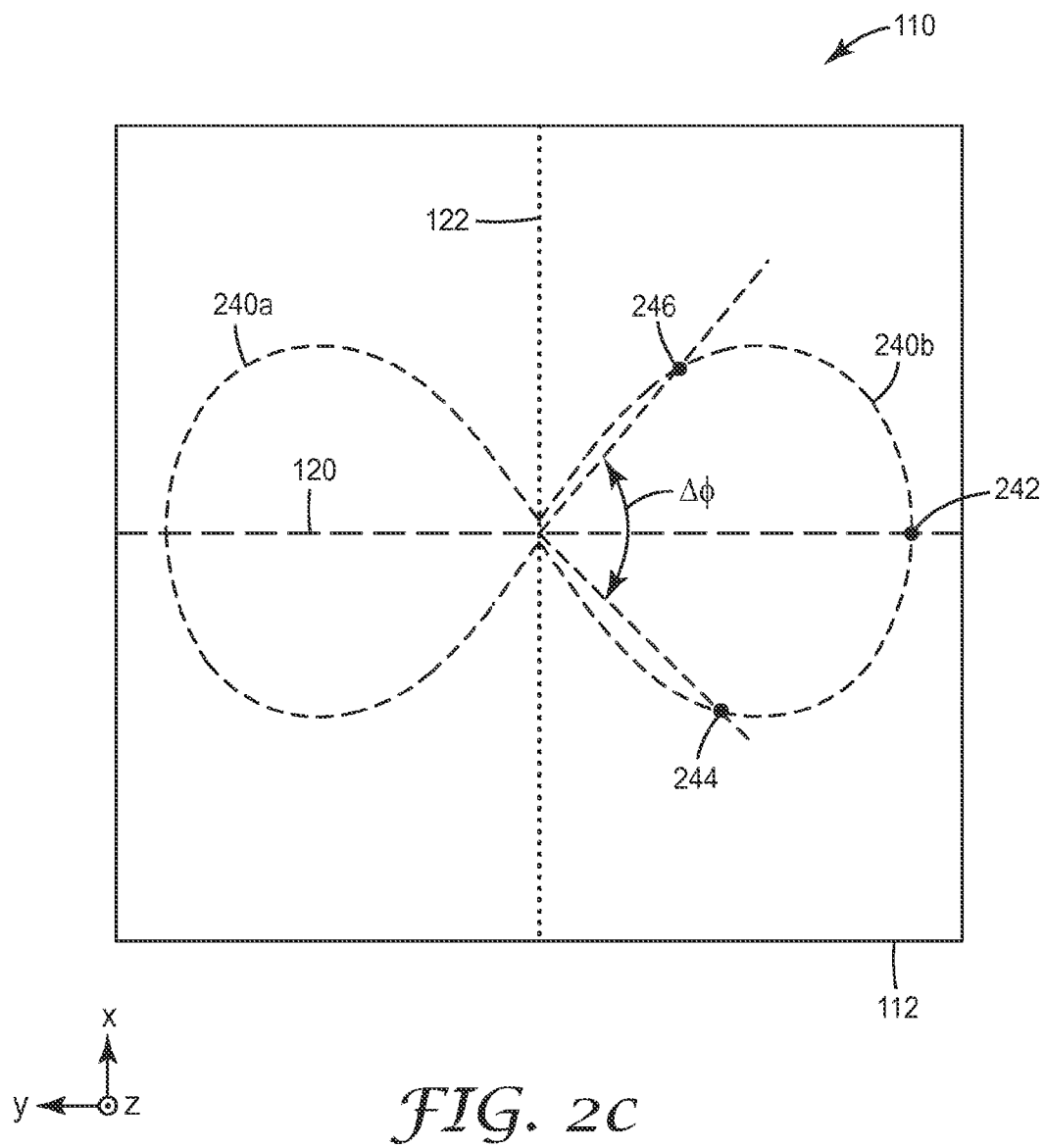
FIG. 2c is a schematic top-down view of the lighting system of FIG. 1.

FIG. 2c is a top or front view of the lighting system 110 from the perspective of observer 130. Superimposed on this view is an azimuthal flux envelope 240 for p-polarized light, the flux envelope labeled by its separate halves or lobes 240a, 240b. The flux envelope 240 represents the brightness or flux (or even percent transmission) of p-polarized light incident for all possible planes of incidence, but at a particular incidence angle θ such as θ=60 degrees or another selected value. A counterpart flux envelope for s-polarized light is uninteresting and unnecessary because of the very small flux or transmission typical of these multilayer optical films for s-polarized light, and is thus not shown. Note that since the transmission of p-polarized light for film 112 is a strong function of incidence angle, selecting a different incidence angle θ, such as θ=50 degrees or θ=70 degrees, will typically produce a somewhat differently-shaped flux envelope, as shown in some of the examples below. The lobes 240a, 240b typically exhibit axial symmetrical with respect to the z-axis, and exhibit mirror symmetry with respect to the x-z plane.

It is useful to quantify the degree of collimation of a given azimuthal flux envelope or a given lobe of such an envelope. We adopt an approach in which a primary direction (or azimuthal angle) of maximum flux is identified, and then secondary directions (or azimuthal angles) are identified on opposed sides of the primary direction, at which the flux is 1/e of the maximum flux, where e is Euler's constant (e≈2.718). The degree of collimation, referred to herein as $\Delta\phi=\Delta\phi e$, where "e" in $\Delta\phi e$ refers to the 1/e condition, is then the azimuthal angle φ subtended between the two secondary directions. In FIG. 2c, the primary direction of maximum flux for lobe 240a corresponds to the point 242, and the secondary directions correspond to points 244, 246. The angle $\Delta\phi e$ between the points 244, 246 can thus be considered to be the degree of collimation of lobe 240b—and also the degree of collimation of lobe 240a, due to symmetry—using the 1/e flux criterion as described.

Note that a polar parameter $\Delta\theta e$, that quantifies the degree of collimation of a polar flux envelope (see e.g. polar angle flux envelope 220 of FIG. 2a), can be calculated in a completely analogous way to the azimuthal parameter $\Delta\phi e$. The polar collimation or angular spread $\Delta\theta e$ can be readily calculated from a graph of reflectivity versus incidence angle θ, such as those shown in FIGS. 5 and 6, or from a corresponding graph of transmissivity versus incidence angle θ. Locating two values of θ at which the transmission drops to 1/e of its maximum value at the oblique angle θoblique, and computing the difference between those two values of θ, yields $\Delta\theta e$.

Of course, it should be understood that light source 210 may emit light in all directions, such as with a CCFL light source, or over a hemisphere of solid angle e.g. for an LED mounted on the back reflector 114, or over a limited set of angles within the hemisphere e.g. for certain "side-emitting" packaged LEDs. It should also be understood that, to the extent film 112 is illuminated so that it transmits light over its entire surface area, the flux envelopes 220, 240 can be considered to be representative of light emitted over all, or over any arbitrary portion, of the surface area of the film.

We now turn to a more detailed description of the reflective multilayer optical film 112, and explain how it can be designed to exhibit the foregoing reflection and transmission properties.

As stated above, multilayer optical films include individual microlayers having different refractive index characteristics so that some light is reflected at interfaces between adjacent microlayers. The microlayers are sufficiently thin so that light reflected at a plurality of the interfaces undergoes constructive or destructive interference to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 μm. However, thicker layers can also be included, such as skin layers at the outer surfaces of the multilayer optical film, or protective boundary layers (PBLs) disposed within the multilayer optical film to separate coherent groupings (known as "stacks" or "packets") of microlayers. If desired, two or more separate multilayer optical films can be laminated together with one or more thick adhesive layers to form a laminate.

In a simple embodiment, the microlayers can have thicknesses and refractive index values corresponding to a ¼-wave stack, i.e., arranged in optical repeat units or unit cells each having two adjacent microlayers of equal optical thickness (f-ratio=50%), such optical repeat unit being effective to reflect by constructive interference light whose wavelength λ is twice the overall optical thickness of the optical repeat unit, where the "optical thickness" of a body refers to its physical thickness multiplied by its refractive index. Thickness gradients along the thickness axis of the film (z-axis) are used to provide a widened reflection band to provide substantially spectrally flat transmission and reflection of light over the extended wavelength band of interest, and also over all angles of interest. Thickness gradients tailored to sharpen the band edges at the wavelength transition between high reflection and high transmission can also be used, as discussed in U.S. Pat. No. 6,157,490 (Wheatley et al.). For polymeric multilayer optical films, reflection bands can be designed to have sharpened band edges as well as "flat top" reflection bands, in which the reflection properties are essentially constant across the wavelength range of application. A spectrally flat, wide reflection band is of particular significance to the multilayer optical films described herein. Other layer arrangements, such as multilayer optical films having 2-microlayer optical repeat units whose f-ratio is different from 50%, or films whose optical repeat units include more than two microlayers, are also contemplated. These alternative optical repeat unit designs can be configured to reduce or to excite certain higher-order reflections, which may be useful if the desired extended wavelength band extends to near infrared wavelengths. See, e.g., U.S. Pat. Nos. 5,360,659 (Arends et al.) and 5,103,337 (Schrenk et al.).

Further details of suitable multilayer optical films and related designs and constructions can be found in U.S. Pat. Nos. 5,882,774 (Jonza et al.), 6,531,230 (Weber et al.), PCT Publication Nos. WO 95/17303 (Ouderkirk et al.), WO 99/39224 (Ouderkirk et al.), and "Giant Birefringent Optics in Multilayer Polymer Mirrors", Science, Vol. 287, March 2000 (Weber et al.).

Multilayer optical films and film bodies can include additional layers and coatings selected for their optical, mechanical, and/or chemical properties. For example, a UV absorbing layer can be added at the incident side of the optical element to protect components from degradation caused by UV light. Additional layers and coatings can also include scratch resistant layers, tear resistant layers, and stiffening agents. See, e.g., U.S. Pat. No. 6,368,699 (Gilbert et al.).

FIG. 3 depicts two adjacent microlayers 302, 304, constituting one optical repeat unit, of a multilayer optical film 300. The film 300 typically includes tens, hundreds, or thousands of such microlayers, as well as optional skin layers and protective boundary layers as described above, none of which are shown in the figure except for the single pair of microlayers. The microlayers are sufficiently thin so that light reflected at a plurality of the interfaces undergoes constructive or destructive interference to give the film the described reflective and transmissive properties. Each microlayer can be characterized, at least in localized positions in the film, by in-plane refractive indices $n_x$, $n_y$, and a refractive index $n_z$ associated with a thickness or z-axis of the film. These indices represent the refractive index of the subject material for light polarized along the mutually orthogonal x-, y-, and z-axes, respectively. The reflective and transmissive properties of the multilayer optical film 300 are a function of these refractive indices of the respective microlayers. Of particular significance is the refractive index difference between adjacent microlayers for light polarized along the x-axis ($\Delta n_x$, the y-axis ($\Delta n_y$), and the z-axis ($\Delta n_z$). Another significant design parameter is the total number of microlayers used, and the layer thickness distribution of the microlayers along the z-axis of the film.

We have found the following design guidelines to be useful to help achieve the desired reflectivity and transmission characteristics of the multilayer optical film as described above. Generally, the in-plane index differences $\Delta n_x$, $\Delta n_y$ should both be substantially mismatched, i.e., they should each have a relatively large magnitude, but they should also be different from each other as described further below. Given these in-plane index mismatches, the total number of microlayers can then be chosen to be large enough to provide a high reflectivity, e.g. at least 75, 80, 85, or 90%, for normally incident light polarized along the x-axis, and for such light polarized along the y-axis.

With regard to the out-of-plane index difference, we select for purposes of the present multilayer optical films a $\Delta n_z$ that is large, preferably on the order of or larger than at least one in-plane index difference $\Delta n_y$, which is contrary to much of the emphasis of prior work on multilayer optical films dealing with $\Delta n_z$. We also select a $\Delta n_z$ that has the same sign or polarity as $\Delta n_y$. In this regard, two refractive index differences $\Delta n_y$, $\Delta n_z$ have the same polarity or sign if the microlayer that has the higher refractive index $n_z$ in the z-direction also has the higher refractive index $n_y$ along the y-direction, and vice versa: the microlayer having the lower refractive index $n_z$ in the z-direction also has the lower refractive index $n_y$ in the y-direction. By selecting an out-of-plane index difference $\Delta n_z$ on the order of or larger than $\Delta n_y$, and of the same sign, we ensure the film has at least one internal Brewster angle, i.e., one in the y-z plane, referred to as the weak plane, and in some cases the Brewster angle may even be accessible from air with flat film surfaces. We allow the effects of this y-z plane Brewster angle to be strong enough to greatly reduce the off-axis reflectivity of p-polarized light incident on the film from an air medium and in the y-z plane, such that the y-axis becomes the weak axis described above.

A Brewster angle is the angle of incidence at which the reflectance of light incident on a plane boundary between two regions having different refractive indices is zero for such light that has its electrical field vector in the plane defined by the direction of propagation and the normal to the surface. In other words, for light incident on a plane boundary between two regions having different refractive indices, a Brewster angle is the angle of incidence at which the reflectance is zero for p-polarized light. For propagation from a first isotropic medium of refractive index $n_1$ to a second isotropic medium of refractive index $n_2$, Brewster's angle is given as arc tan $(n_2/n_1)$. By "internal Brewster angle", we refer to a Brewster angle at an interface that is internal to the film and not at an interface with air or other components in the system, whether or nor it is possible to inject light from an external air medium into the film such that it propagates at the internal Brewster angle. An internal Brewster angle can be present in an optical structure when there is an interface within the structure between adjacent portions having two different indices of refraction. In general, a given multilayer optical film may or may not have an internal Brewster angle. For example, if one or both of the alternating layers in a multilayer optical mirror film are birefringent, and the z-indices of refraction of the layers have a certain differential, $\Delta n_z$, relative to the in-plane indices, then no internal Brewster angle will exist. However, the refractive indices may be alternatively selected to provide a different $\Delta n_z$ that, in concert with the in-plane index difference, produces an internal Brewster angle. Note that a given interface may in general possess two, one, or zero internal Brewster angles: a first internal Brewster angle for light incident in the x-z plane, and a second internal Brewster angle for light incident in the y-z plane; an internal Brewster angle for light in only the y-z plane; or no internal Brewster angle in either the x-z plane or the y-z plane.

Returning now to our discussion of design guidelines useful to achieve the desired reflectivity and transmission characteristics, besides selecting $\Delta n_x$ and $\Delta n_y$ to both be substantially mismatched, and besides selecting $\Delta n_z$ to be large relative to $\Delta n_y$ and of the same sign, we also ensure that the other in-plane index difference $\Delta n_x$ is different enough from $\Delta n_y$ so that the combination of $\Delta n_x$ and $\Delta n_z$ for the selected total number of microlayers does not result in any strong transmission of p-polarized light at highly oblique angles. In this way, the x-axis becomes the strong axis described above. One way of doing this is by selecting $\Delta n_x$ to be the same sign or polarity as $\Delta n_y$, but of greater magnitude. In this case, $\Delta n_x$, $\Delta n_y$, and $\Delta n_z$ will all be of the same polarity or sign. The greater magnitude of $\Delta n_x$ relative to $\Delta n_y$ (for the given amount of $\Delta n_z$ and for the given number of microlayers) produces an internal Brewster angle in the x-z plane that is more oblique than the internal Brewster angle in the y-z plane. This allows the reflectivity of p-polarized light in the x-z plane to remain high (e.g. at least 75%) over all incidence angles in air, even though such reflectivity decreases slightly at some oblique angles relative to normal due to the x-z plane Brewster angle.

Another way of ensuring that $\Delta n_x$ is different enough from $\Delta n_y$ so that the combination of $\Delta n_x$ and $\Delta n_z$ does not result in any strong transmission of p-polarized light at highly oblique angles is to select $\Delta n_x$ to have a different sign or polarity than $\Delta n_y$ (and $\Delta n_z$). This can be done with a combination of positive birefringent materials and negative birefringent materials in the multilayer stack, although not every combination of positive and negative birefringent materials will satisfy the other guidelines described above that allow for the desired reflectance and transmission properties. This approach results in no internal Brewster angle in the x-z plane. Such a multilayer film thus has only one internal Brewster angle, the one in the y-z plane. With this approach, it is possible for the "strong axis" index difference $\Delta n_x$ to have a magnitude that is smaller than the magnitude of the "weak axis" index difference $\Delta n_y$ and still maintain the desired reflectance and transmission properties described above.

Note that in the forgoing discussion, assigning labels to the respective in-plane axes is arbitrary, and any convention can be used. For example, one may choose to associate the strong axis with the y-axis, and to associate the weak axis with the x-axis.

Figures 3A, 3B:
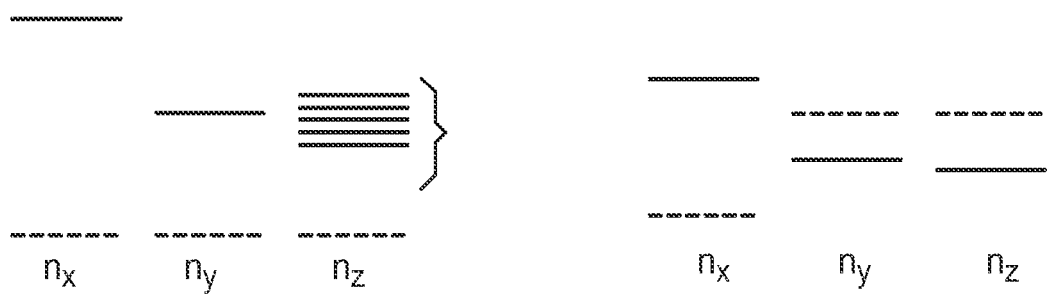
FIGS. 3a-b depict exemplary refractive index relationships that can be used to help achieve the desired reflection and transmission characteristics of the multilayer optical film.

FIGS. 3a-b depict exemplary refractive index relationships that may satisfy the guidelines discussed above and that are achievable with existing coextrudable polymer materials and known processing equipment through judicious materials selection and processing conditions. In these figures, the relative refractive indices of two materials, corresponding to the two adjacent microlayers in a multilayer optical film, are shown in three columns corresponding to the refractive index of each material in the x-, y-, and z-direction, where solid bars are used for one material and broken-line bars are used for the other material. The vertical axis in each of the figures is not labeled, but corresponds to refractive index with a higher bar corresponding to a higher refractive index. Of course, the refractive index difference for a given axis can be readily determined by comparing the level of the solid bar to the level of the broken bar for the appropriate column.

FIG. 3a represents exemplary refractive indices for layer pairs in which the higher refractive index material is positively birefringent and the lower refractive index material is isotropic. In this figure, the z-index of the birefringent material is shown as a sequence of solid bars to demonstrate that $\Delta n_z$ can be on the order of $\Delta n_y$ or greater, and of the same sign. Note that $\Delta n_z$ may be somewhat smaller than $\Delta n_y$ and still be "on the order of" $\Delta n_y$, depending on the value of $\Delta n_x$ and the number of microlayers used. Stretching of the positively birefringent material under appropriate conditions causes its refractive index $n_x$ in the x-direction to increase and its refractive indices in the y- and z-directions, $n_y$ and $n_z$, to decrease.

FIG. 3b represents exemplary refractive indices for layer pairs in which one material is positively birefringent (solid bars) and the other material is negatively birefringent (dashed bars). The depicted indices are representative of the embodiment described below in which syndiotactic polystyrene (sPS) is used as the negatively birefringent material and a 30/70 coPEN is used as the positively birefringent material. The depicted refractive indices can be achieved by stretching the (initially isotropic) coextruded layers in the x-direction under the proper conditions. In contrast to most multilayer stacks, neither material in the embodiment of FIG. 3b can be identified as a "high index" layer or a "low index" layer, since the material having the higher index in the x-direction has the lower index in the y-direction, and vice versa.

A variety of polymer materials are currently available from which one can select pairs of materials that are coextrudable and otherwise processable with known coextrusion and tentering equipment to produce the described multilayer optical films, and that can achieve the desired refractive index relationships discussed above. Additional suitable materials will likely become available in the future as well. An exemplary negatively birefringent material currently available is syndiotactic polystyrene (sPS). Certain copolymers or blends of polyethylene naphthalate (PEN) based upon naphthalene dicarboxylic acid and various other monomers used in making polyesters, referred to as "coPENs", are useful as positively birefringent polymers, as are polyethylene terephthalate (PET) as well as other polyesters and copolyesters. A particularly suitable coPEN is a copolymer of 90% PEN and 10% PET, referred to as "90/10 coPEN". The coPEN can be polymerized directly from a mixture of the constituent monomers used to make the separate polymers, or the copolymer can be made by blending in an extruder and melt train for a sufficient time and temperature. Suitable low refractive index isotropic materials include: Neostar Elastomer FN007, a copolyester available from Eastman Chemical Company, Kingsport, Tenn.; Kraton G1657, a styrene ethylene/butadiene styrene block copolymer available from Kraton Polymers; polyethylene; copolymers of polypropylene and polyethylene; polymethyl methacrylate ("PMMA"); copolymers of PMMA ("coPMMA"); polyvinyl butyral ("PVB"); polyvinyl alcohol ("PVA"); ethylene/octene copolymers; polylactic acid ("PLA"); THV™ fluoropolymer available from 3M Company, St. Paul, Minn.; and a Silicone Poly-oxamide (SPOx), or more precisely a "polydiorganosiloxane polyoxamide block copolymer" as described in commonly assigned U.S. Patent Application Publication US 2007/0177272 (Benson et al.), "Multilayer Films Including Thermoplastic Silicone Block Copolymers". Other silicones and fluoropolymers are also useful as low index materials. An exemplary positively birefringent material includes a copolymer of 70% PET and 30% PEN, referred to as "30/70 coPEN".

The control of color in the reflective multilayer optical films can be important when the transmitted light is viewed directly as in a backlit display, or when transmitted light is used for purposes of viewing other objects as in general illumination. This usage is in contrast to typical mirrors which are viewed in reflection, i.e., when only reflected light is viewed. For partial reflectors having low transmission, small variations in transmission at different wavelengths, such as e.g. a mirror having 5% transmission at some wavelengths and 10% transmission at other wavelengths, can produce a rather colorful film. The color is controlled by the shape of the reflectance spectrum. Known processes, such as vacuum deposition, can precisely control the layer thickness value of each individual layer in the layer stack to control the color of mirrors having intermediate reflectance. However, individual layer control is more difficult using polymer coextrusion techniques with hundreds of individual polymer layers.

U.S. Pat. Nos. 5,126,880 (Wheatley et al.) and 5,568,316 (Schrenk et al.) teach the use of combinations of thin and very thick layers to reduce the iridescence of multilayer interference reflectors. If a high reflectivity is desired at some angle, e.g. at normal incidence, then a large number of layers is required with this approach, and this results in a very thick film which increases the light losses in the film.

A preferred approach is to use all or mostly quarter-wave film stacks. In this case, control of the spectrum requires control of the layer thickness profile in the film stack. A broadband spectrum, such as one required to reflect visible light over a large range of angles in air, still requires a large number of layers if the layers are polymeric, due to the relatively small index differences achievable with polymer films compared to inorganic films. Layer thickness profiles of such films can be adjusted to provide for improved spectral characteristics using the axial rod apparatus taught in U.S. Pat. No. 6,783,349 (Neavin et al.) combined with layer profile information obtained with microscopic techniques.

Polymeric multilayer optical films with high layer counts (greater than about 250 layers) have traditionally been made using a layer multiplier, i.e. they have been constructed of multiple packets of layers which were generated from a single set of slot generated layers in a feedblock. This method is outlined in U.S. Pat. No. 6,783,349 (Neavin et al.). Although such layer multiplier devices greatly simplify the generation of a large number of optical layers, the distortions they impart to each resultant packet of layers are not identical for each packet. For this reason, any adjustment in the layer thickness profile of the layers generated in the feedblock is not the same for each packet, meaning that all packets cannot be simultaneously optimized to produce a uniform smooth spectrum free of spectral disruptions. Thus, an optimum profile and low transmission color reflector is difficult to make with multi-packet films using multipliers. If the number of layers in a single packet generated directly in a feedblock do not provide sufficient reflectivity, then two or more such films can be laminated to increase the reflectivity, although this will in general increase the losses in the mirror.

A desirable technique for providing a multilayer optical film with a low color, or a controlled color spectrum, is therefore as follows:
1) The use of an axial rod heater control of the layer thickness values of coextruded polymer layers as taught in U.S. Pat. No. 6,783,349 (Neavin et al.).
2) A feedblock design such that all layers in the stack are directly controlled by an axial rod heater zone during layer formation, i.e. no use of layer multipliers.
3) Timely layer thickness profile feedback during production from a layer thickness measurement tool such as e.g. an atomic force microscope (AFM), a transmission electron microscope, or a scanning electron microscope.
4) Optical modeling to generate the desired layer thickness profile.
5) Repeating axial rod adjustments based on the difference between the measured layer profile and the desired layer profile.

Although not as accurate in general as an AFM, the layer profile can also be quickly estimated by integrating the optical spectrum (integrating the −Log(1−R) vs. wavelength spectrum). This follows from the general principle that the spectral shape of a reflector can be obtained from the derivative of the layer thickness profile, provided the layer thickness profile is monotonically increasing or decreasing with respect to layer number.

The basic process for layer thickness profile control involves adjustment of axial rod zone power settings based on the difference of the target layer thickness profile and the measured layer profile. The axial rod power increase needed to adjust the layer thickness values in a given feedblock zone may first be calibrated in terms of watts of heat input per nanometer of resulting thickness change of the layers generated in that heater zone. Fine control of the spectrum is possible using 24 axial rod zones for 275 layers. Once calibrated, the necessary power adjustments can be calculated once given a target profile and a measured profile. The procedure is repeated until the two profiles converge.

We turn now to FIGS. 4 and 4a to address certain geometrical considerations and conventions when discussing the various angles and directions of incident and reflected light with respect to a film or body. FIG. 4 investigates the behavior of light incident on an "ideal" polarizing film, to make the point that one must specify the incidence direction of s- and p-polarized light before one can draw conclusions about its transmission or reflection by the film. A light ray 410 is incident on an ideal polarizing film 402 at an angle of incidence θ, thereby forming a plane of incidence 412. The film 402 includes a pass axis 406 that is parallel to the x-axis, and a block axis 404 that is parallel to the y-axis. The plane of incidence 422 of ray 420 is parallel to the block axis 404. Ray 420 has a p-polarized component that is in the plane of incidence 422, and an s-polarized component that is orthogonal to the plane of incidence 422. The p-pol light of ray 420 is at least partially parallel to the block axis 404 of polarizer 402 and may therefore, depending on the incidence angle, be reflected by the polarizer, while the s-pol light of ray 420 is parallel to the pass axis 406 of polarizer 402 and, at least in part, be transmitted.

Further, FIG. 4 illustrates ray 410 that is incident on polarizer 402 in a plane of incidence 412 that is parallel to the pass axis 406 of the polarizer 402. Therefore, the p-pol light of ray 410 is parallel to the pass axis 406 of the polarizer 402, while the s-pol light of ray 410 is parallel to the block axis 404 of polarizer 402. As a result, if the polarizer 402 is an "ideal" polarizer that has a reflectance of 100% at all angles of incident light for light polarized in the block axis and 0% at all angles of incident light for light polarized in the pass axis, the polarizer transmits s-pol light of ray 420 and the p-pol light of ray 410, while reflecting the p-pol light of ray 420 and the s-pol light of ray 410. In other words, the polarizer 402 will transmit a combination of p- and s-pol light.

FIG. 4a shows an arbitrary direction vector passing through the origin of the x-y-z coordinate system and also passing through a point p. The point p has a projection p' in the x-y plane. The direction vector, which may correspond to a direction of incidence, reflection, or transmission, subtends a polar angle θ with respect to the z-axis. The projection of the vector in the x-y plane makes an azimuthal angle φ with respect to the x-axis, or with respect to some other designated axis in the x-y plane. The direction vector can thus be characterized uniquely by the angle pair θ, φ, where θ ranges from 0 to 90 degrees and φ ranges from 0 to 360 degrees, or from −180 to +180 degrees, for example. Note also that a plane of incidence for light incident on a film disposed in the x-y plane can be specified by the azimuthal angle φ, with the x-z plane being specified by φ=0 or 180 degrees and the y-z plane being specified by φ=90 or −90 or 270 degrees.

We describe now some particular multilayer optical film embodiments suitable for use as high transmission flux leveling films with the desired reflection and transmission characteristics discussed above.

In a first case, we select 90/10 coPEN for one of the polymers in the alternating stack and a silicone poly-oxamide (SPOx) as the other polymer. These polymers are compatible for coextrusion and exhibit acceptable inter-layer adhesion when stretched. An extrudate of alternating layers of these materials can be oriented under suitable conditions to provide a multilayer optical film having the following refractive indices:

|  | $n_x$ | $n_y$ | $n_z$ |
|---|---|---|---|
| 90/10 coPEN microlayers | 1.820 | 1.570 | 1.550 |
| SPOx microlayers | 1.410 | 1.410 | 1.410 |
| Skin 1 | 1.564 | 1.564 | 1.564 |
| Skin 2 | 1.564 | 1.564 | 1.564 |
| External | 1.0 | 1.0 | 1.0 |

These indices provide each microlayer interface with two internal Brewster angles, one in the x-z plane and one in the y-z plane. The indices also reveal that the y-axis is the weak axis and the x-axis is the strong axis. This embodiment assumes 550 individual microlayers arranged in a single stack or packet with no intervening protective boundary layers, half of the microlayers being composed of the 90/10 coPEN and the other half of the SPOx, in an alternating arrangement. The stack thus consists essentially of 275 optical repeat units, each repeat unit containing one microlayer of 90/10 coPEN and one microlayer of SPOx. The stack also incorporates a monotonic layer thickness gradient across the thickness direction of the film, with the thinnest optical repeat unit, at one end of the stack, having an optical thickness of 200 nm, and the thickest optical repeat unit, at the opposite end of the stack, having an optical thickness of 475 nm. This layer distribution provides a substantially flat, wide reflection band extending from 400 nm to 950 nm. Finally, this embodiment includes optically thick skin layers on opposite sides of the stack, the skin layers having isotropic refractive indices as shown in the table above and being representative of PETg, available from Eastman Chemicals. Each skin layer contacts the microlayer stack on one side and air ("External" in the table above) on the other side.

This first embodiment was modeled with the aid of a computer and its reflectivity calculated as a function of direction of incidence in air, polarization, and wavelength. For each incidence direction and polarization, the calculated reflectivities were averaged over the wavelength range of interest, typically from 420 to 680 nm, to provide spectrally averaged reflectivity values. The results so obtained, and including the effects of the only one film/air interface at the outer surface of one of the skin layers, are shown in FIG. 5.

Figure 5:
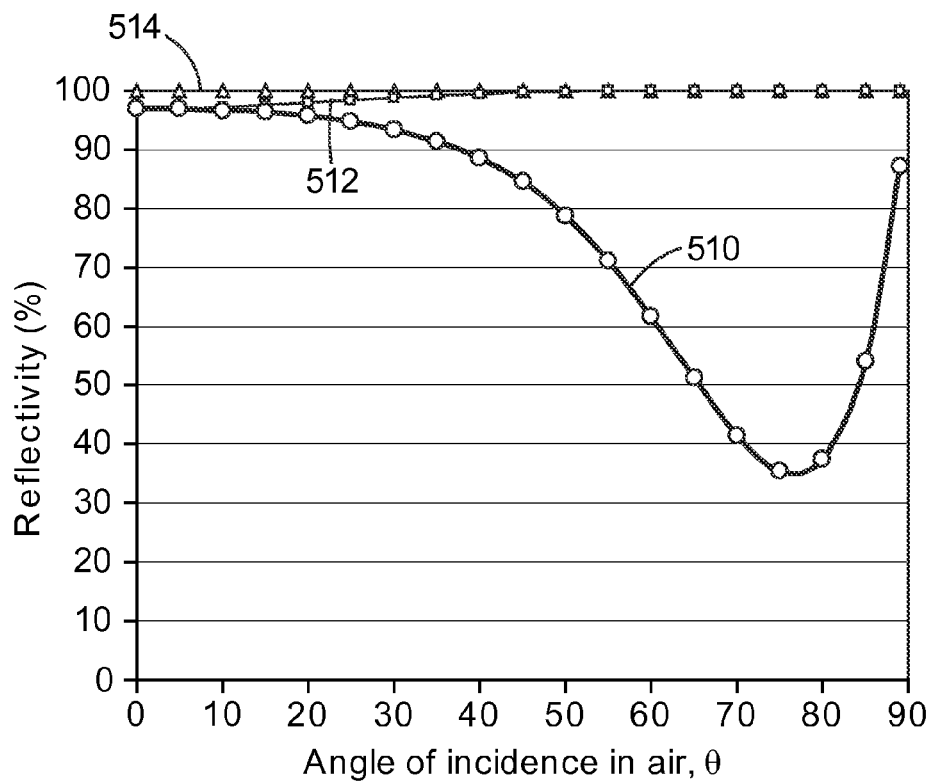
FIG. 5 is a graph of reflectivity versus incidence angle for a multilayer optical film having two internal Brewster angles, and FIGS. 5a and 5b graph the transmission properties of the film as a function of azimuthal angle φ for different polar (or incidence) angles θ.

In FIG. 5, curve 510 is for p-polarized incident in the weak (y-z) plane, curve 512 is for s-polarized light incident in the strong (x-z) plane, curve 514 (triangular data points) is for p-polarized light incident in the strong plane, and the reflectivity of s-polarized light incident in the weak plane is indistinguishable (on the scale of the graph) from the reflectivity=100% line and is thus not labeled. Note the high reflectivity for normally incident light of all polarizations. Note also the large dip in reflectivity for p-polarized light incident in the weak plane, decreasing to less than half of the on-axis value at incidence angles from about 70 to 80 degrees. Finally, note that high reflectivity is maintained over all incidence angles for p-polarized light incident in the strong plane.

Figure 5A:
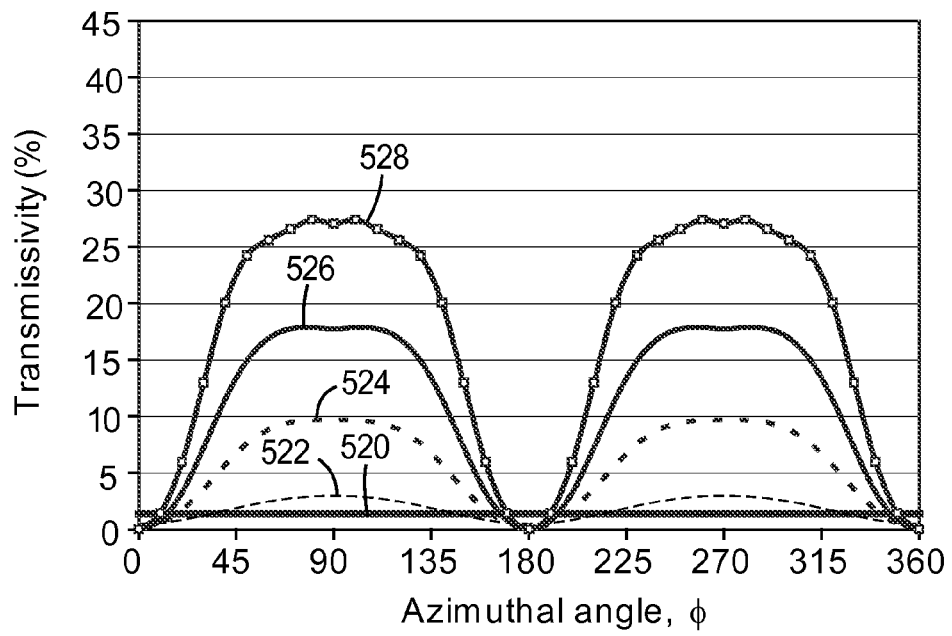

FIG. 5a plots the calculated average transmissivity (equal to 100% minus percent average reflectivity) of the first embodiment as a function of azimuthal angle φ, with each separate curve being calculated for a particular incidence angle θ. The angle φ is measured with respect to the strong or x-axis, such that φ=0, 180, or 360 corresponds to the strong axis and φ=90 or 270 corresponds to the weak (y) axis. "Average transmissivity" here refers to averaging the transmission for both orthogonal polarizations (s-pol and p-pol), for each calculated datapoint. Curve 520 is for θ=0 degrees (normal incidence, which of course exhibits no change as a function of azimuthal angle), curve 522 is for θ=30 degrees, curve 524 is for θ=50 degrees, curve 526 is for θ=60 degrees, and curve 528 is for θ=70 degrees. Some of this same transmissivity data is plotted in polar form in FIG. 5b. In that figure, the radial distance from the center of the plot represents the transmissivity value, and azimuthal angle φ is labeled around the circumference, where again φ=0 corresponds to the strong (x) axis. Curve 530 is for θ=40 degrees, curve 532 is for θ=50 degrees, curve 534 is for θ=60 degrees, and curve 536 is for θ=70 degrees.

In a second multilayer optical film embodiment, we again select 90/10 coPEN for one of the polymers in the alternating stack, but we now select THV as the low index isotropic polymer. These polymers are compatible for coextrusion and exhibit acceptable inter-layer adhesion when stretched. An extrudate of alternating layers of these materials can be oriented under suitable conditions to provide a multilayer optical film having the following refractive indices:

|  | $n_x$ | $n_y$ | $n_z$ |
|---|---|---|---|
| 90/10 coPEN microlayers | 1.82 | 1.57 | 1.56 |
| THV microlayers | 1.35 | 1.35 | 1.35 |
| Skin 1 | 1.564 | 1.564 | 1.564 |
| Skin 2 | 1.564 | 1.564 | 1.564 |
| External | 1.0 | 1.0 | 1.0 |

The indices shown here again provide each microlayer interface with two internal Brewster angles, one in the x-z plane and one in the y-z plane, with the y-axis again corresponding to the weak axis and the x-axis corresponding to the strong axis of the film. This second embodiment assumes only 275 individual microlayers arranged in a single stack or packet with no intervening protective boundary layers, about half of the microlayers being composed of the 90/10 coPEN and the remaining microlayers composed of the THV, in an alternating arrangement. The stack thus consists essentially of about 137 optical repeat units, each repeat unit containing one microlayer of 90/10 coPEN and one microlayer of THV. The stack also incorporates a monotonic layer thickness gradient across the thickness direction of the film, with the thinnest optical repeat unit, at one end of the stack, having an optical thickness of 200 nm, and the thickest optical repeat unit, at the opposite end of the stack, having an optical thickness of 475 nm. This layer distribution provides a substantially flat, wide reflection band extending from 400 nm to 950 nm. Finally, this embodiment includes optically thick skin layers on opposite sides of the stack, the skin layers having isotropic refractive indices as shown in the table above and being representative of PETg, available from Eastman Chemicals. Each skin layer contacts the microlayer stack on one side and air ("External" in the table above) on the other side.

This second embodiment was modeled with the aid of a computer in similar fashion to the first embodiment. Wavelength averaging from typically 420 to 680 nm was again used, and for this second embodiment the effects of two film/air interfaces (the outer surfaces of both skin layers) were included in the reflectivity and transmission calculations.

Figure 6:
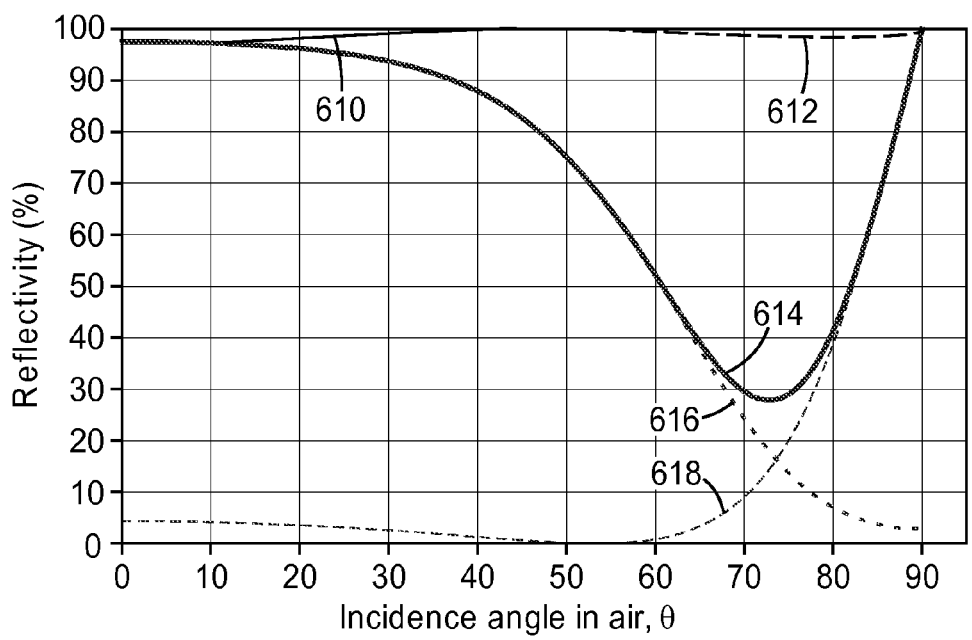
FIG. 6 is a graph of reflectivity versus incidence angle for another multilayer optical film that also has two internal Brewster angles.

FIG. 6 plots the calculated reflectivity versus incidence angle θ for the second embodiment. Curve 610 is for s-polarized light incident in the strong (x-z) plane, curve 612 is for p-polarized light incident in the strong plane, curve 614 is for p-polarized light incident in the weak (y-z) plane, and the reflectivity of s-polarized light incident in the weak plane is indistinguishable (on the scale of the graph) from the reflectivity=100% line and is thus not labeled. The graph also includes curve 616, which is the component of curve 614 attributable to the multilayer stack only (no film/air interface effects included), and curve 618, which is the component of curve 614 attributable to the two film/air interfaces (no multilayer stack effects included).

Note again for this second embodiment the high reflectivity for normally incident light of all polarizations. Note also the large dip in reflectivity for p-polarized light incident in the weak plane, decreasing to less than half of the on-axis value at incidence angles from about 65 to 80 degrees. Finally, note that high reflectivity is maintained over all incidence angles for p-polarized light incident in the strong plane.

Figure 6A:
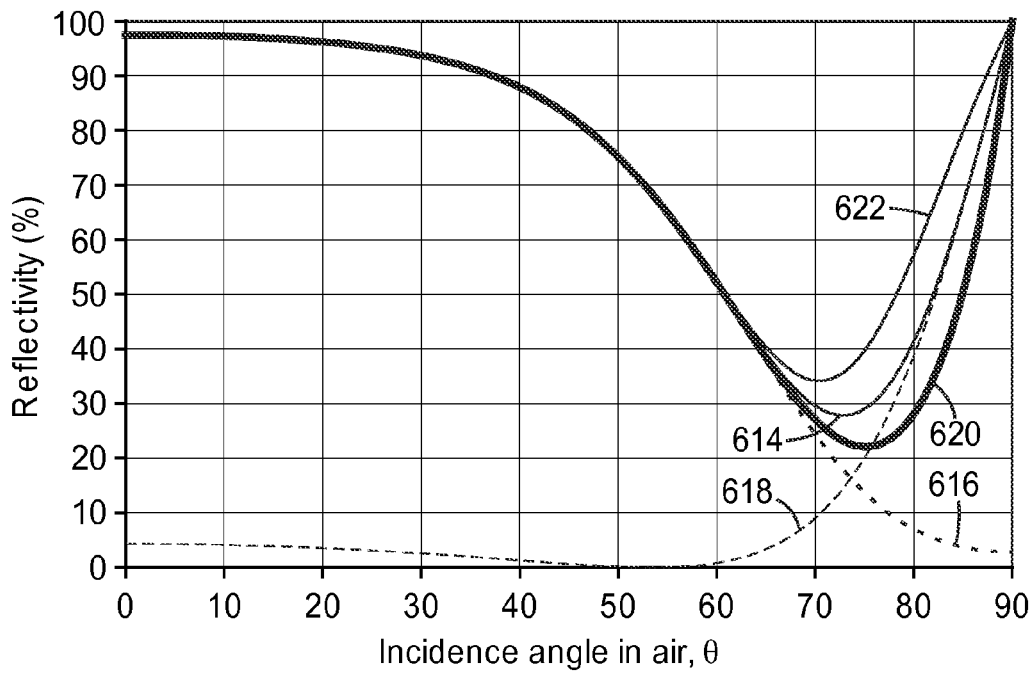
FIG. 6a is similar to FIG. 6 except that it includes a family of curves that differ by how many film/air interface surface reflections are included in the reflectivity calculation.

FIG. 6*a* is a graph similar to FIG. 6 except that it includes a family of curves that differ by how many film/air interface surface reflections are included in the reflectivity calculation. Curves 614, 616, and 618 are reproduced from FIG. 6. Added to these curves are curve 622, which is the p-pol reflectivity of the second embodiment for light in the weak plane, including the effects of four air/film surface reflections, and curve 620, which is similar but includes the effects of only one air/film surface reflection. The film for each air/film surface is THV, which has an index of about 1.35.

Figure 6B:
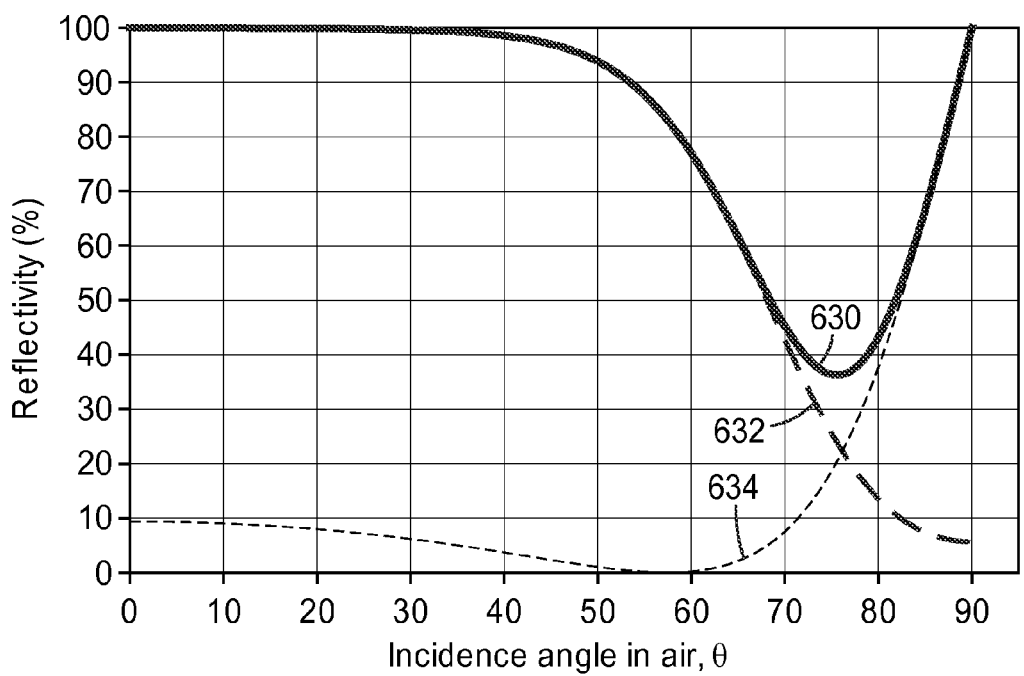
FIG. 6b is a graph of reflectivity versus incidence angle for a multilayer optical film similar to that associated with FIG. 6, but having 550 microlayers rather than 275.

FIG. 6*b* explores the effects of the number of microlayers used in the multilayer optical film. For this FIG. 6*b*, a third embodiment was modeled that was the same as the second embodiment, using the same 90/10 coPEN and THV materials with their indicated refractive indices, but now instead of 275 total microlayers, 550 were used, and the skin layers were birefringent 90/10 coPEN. The same monotonic layer thickness gradient as in the second embodiment was used, but it was rescaled for 550 layers (275 optical repeat units) so that again the thinnest optical repeat unit, at one end of the stack, had an optical thickness of 200 nm, and the thickest optical repeat unit, at the opposite end of the stack, had an optical thickness of 475 nm, again providing a substantially flat, wide reflection band extending from 400 nm to 950 nm. Reflectivities calculated for this third embodiment again used wavelength averaging from typically 420 to 680 nm, and the effects of two film/air interfaces were included in the reflectivity and transmission calculations. Curve 630 plots the reflectivity for p-polarized light incident in the weak (y-z) plane, as a function of incidence angle θ. Curve 632 is the component of curve 630 attributable to the multilayer stack only (no film/air interface effects included), and curve 634 is the component of curve 630 attributable to the two film/air interfaces (no multilayer stack effects included).

Figure 6C:
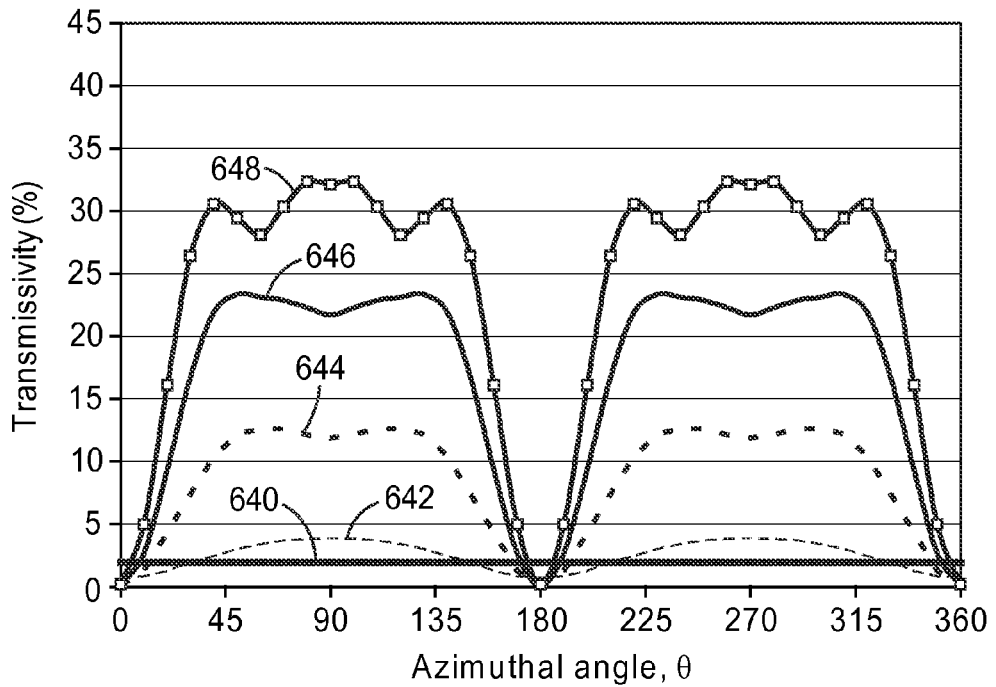
FIG. 6c is a graph of transmission versus azimuthal angle for different polar angles, for an embodiment similar to that of FIG. 6 but having birefringent skin layers.
Figure 6D:
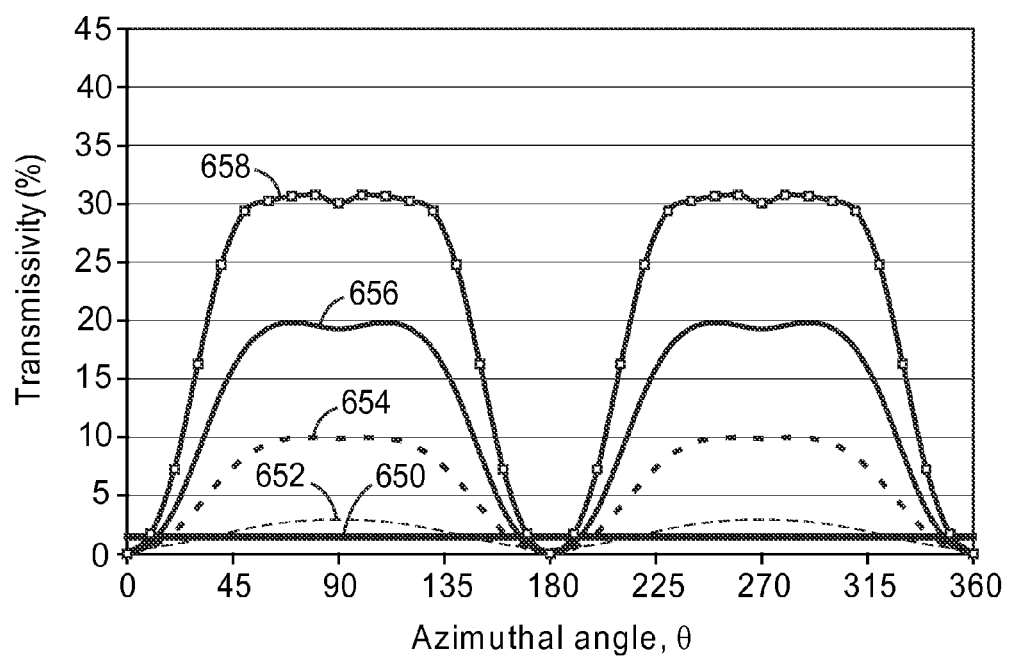
FIG. 6d is similar to FIG. 6c but where the skin layers of the multilayer optical film are isotropic.

For FIGS. 6*c* and 6*d* we return to the second multilayer optical film embodiment, with 275 total microlayers using 90/10 coPEN and THV, but then we create new embodiments by exploring the effects of substituting different materials for the skin layers. A fourth embodiment uses the birefringent 90/10 coPEN as the material for both skin layers, yielding the following refractive index set:

|  | $n_x$ | $n_y$ | $n_z$ |
|---|---|---|---|
| 90/10 coPEN microlayers | 1.82 | 1.57 | 1.57 |
| THV microlayers | 1.35 | 1.35 | 1.35 |
| Skin 1 | 1.82 | 1.57 | 1.57 |
| Skin 2 | 1.82 | 1.57 | 1.57 |
| External | 1.0 | 1.0 | 1.0 |

A fifth embodiment was created by switching all of the coPEN layers to THV and vice versa, without making any changes to the physical thicknesses of the layers. Also, the material of the optically thick skin layers was changed to THV. This yielded the following refractive index set:

|  | $n_x$ | $n_y$ | $n_z$ |
|---|---|---|---|
| 90/10 coPEN microlayers | 1.82 | 1.57 | 1.57 |
| THV microlayers | 1.35 | 1.35 | 1.35 |
| Skin 1 | 1.35 | 1.35 | 1.35 |
| Skin 2 | 1.35 | 1.35 | 1.35 |
| External | 1.0 | 1.0 | 1.0 |

The reflectivity of these embodiments was calculated as before, with wavelength averaging and including the effects of two film/air surface reflections. The resulting calculated transmission for the fourth embodiment is shown in FIG. 6*c*, where percent transmission is plotted against azimuthal angle φ for various incidence angles θ, and the percent transmission of the fifth embodiment is plotted similarly in FIG. 6*d*. In FIG. 6*c*, curve 640 is for θ=0 degrees, curve 642 is for θ=30 degrees, curve 644 is for θ=50 degrees, curve 646 is for θ=60 degrees, and curve 648 is for θ=70 degrees. In FIG. 6*d*, curve 650 is for θ=0 degrees, curve 652 is for θ=30 degrees, curve 654 is for θ=50 degrees, curve 656 is for θ=60 degrees, and curve 658 is for θ=70 degrees.

Note that the different skin layer materials for the fifth embodiment relative to the fourth embodiment, combined with the switch of optical materials for the microlayers with no change in their thicknesses for the fifth embodiment, yielded slightly different overall transmission values for the fifth embodiment relative to the fourth embodiment.

In a sixth multilayer optical film embodiment, we select syndiotactic polystyrene (sPS) for one of the polymers in the alternating stack, and we select coPEN as the other polymer. These polymers are compatible for coextrusion and exhibit acceptable inter-layer adhesion when stretched. An extrudate of alternating layers of these materials can be oriented under suitable conditions to provide a multilayer optical film having the following refractive indices:

|  | $n_x$ | $n_y$ | $n_z$ |
|---|---|---|---|
| sPS microlayers | 1.52 | 1.62 | 1.62 |
| coPEN microlayers | 1.76 | 1.56 | 1.53 |
| Skin 1 | 1.76 | 1.56 | 1.53 |
| Skin 2 | 1.76 | 1.56 | 1.53 |
| External | 1.0 | 1.0 | 1.0 |

Note that the sPS becomes negatively birefringent after stretching, and the coPEN becomes positively birefringent. The indices shown here provide each microlayer interface with only one internal Brewster angle: one in the y-z plane, but none in the x-z plane. The y-axis corresponds to the weak axis, and the x-axis corresponds to the strong axis of the film. This sixth embodiment assumes 2000 individual microlayers arranged in a single stack or packet with no intervening protective boundary layers, half of the microlayers being composed of the sPS and the remaining microlayers composed of the coPEN, in an alternating arrangement. The stack thus consists essentially of 1000 optical repeat units, each repeat unit containing one microlayer of sPS and one microlayer of coPEN. The stack also incorporates a monotonic layer thickness gradient across the thickness direction of the film, with the thinnest optical repeat unit, at one end of the stack, having an optical thickness of 213 nm, and the thickest optical repeat unit, at the opposite end of the stack, having an optical thickness of 425 nm. This layer distribution provides a substantially flat, wide reflection band extending from 425 nm to 850 nm. Finally, this embodiment includes optically thick skin layers on opposite sides of the stack, the skin layers having the birefringent refractive indices of the coPEN microlayers. Each skin layer contacts the microlayer stack on one side and air ("External" in the table above) on the other side.

This sixth embodiment was modeled with the aid of a computer in similar fashion to the other embodiments. Wavelength averaging from typically 420 to 680 nm was again used, and for this sixth embodiment the effects of two film/air interfaces (the outer surfaces of both skin layers) were included in the reflectivity and transmission calculations.

Figure 7:
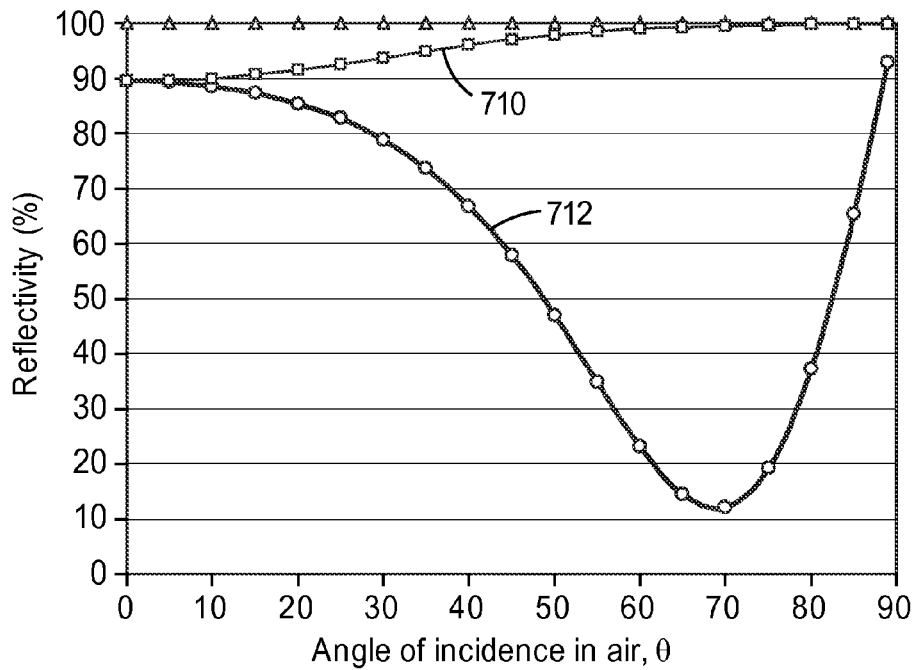
FIG. 7 is a graph of reflectivity versus incidence angle for yet another multilayer optical film, but this one has only one internal Brewster angle and uses a combination of positive and negative birefringent materials.

FIG. 7 plots the calculated reflectivity versus incidence angle θ for the sixth embodiment. Curve 710 is for s-polarized light incident in the strong (x-z) plane, curve 712 is for p-polarized light incident in the weak (y-z) plane, and the reflectivity of s-polarized light incident in the weak plane, and also the reflectivity of p-polarized light incident in the strong plane, are both indistinguishable (on the scale of the graph) from the reflectivity=100% line and are thus not labeled.

Note again for this sixth embodiment the high reflectivity for normally incident light of all polarizations. Note also the large dip in reflectivity for p-polarized light incident in the weak plane, decreasing to less than half of the on-axis value at incidence angles from about 50 to 80 degrees. Finally, note that high reflectivity is maintained over all incidence angles for p-polarized light incident in the strong plane.

Figure 7A:
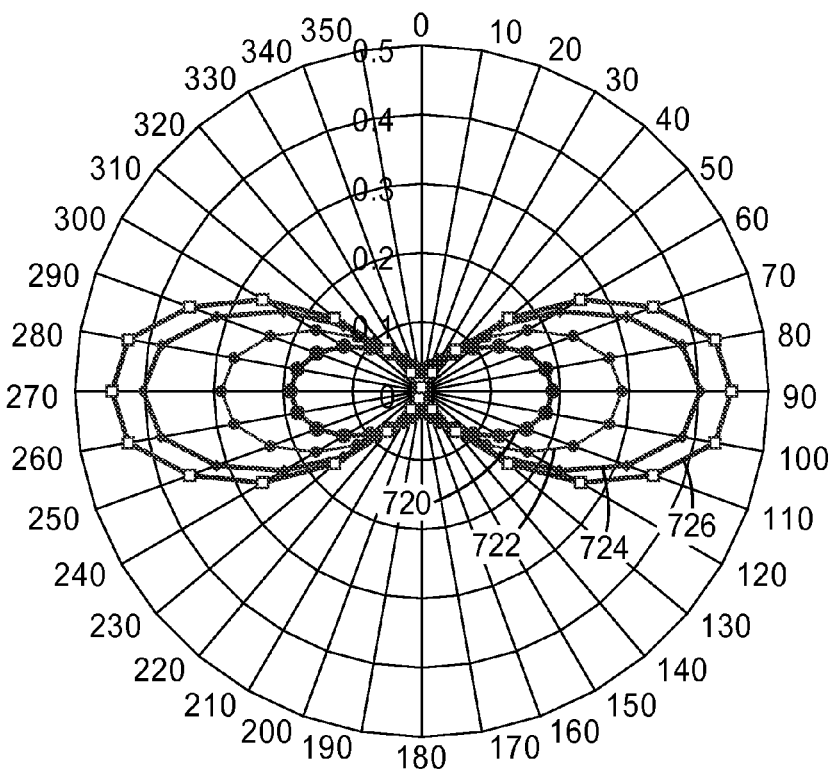
FIGS. 7a and 7b graph the transmission properties of this film as a function of azimuthal angle φ for different polar angles.
Figure 7B:
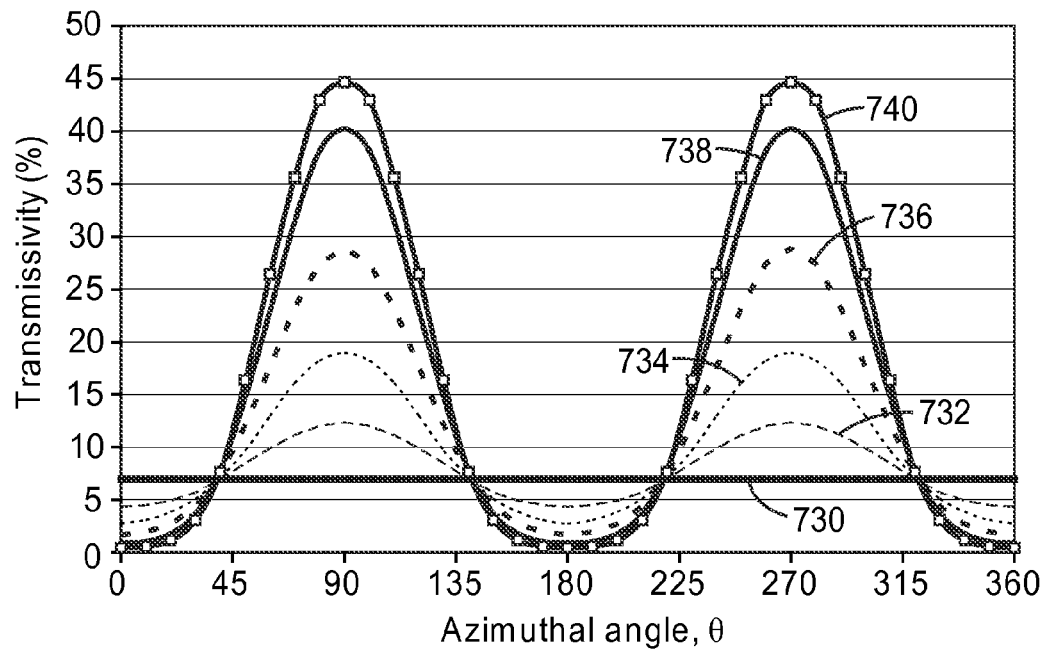

FIG. 7a plots the calculated average transmissivity (equal to 100% minus percent average reflectivity) of the sixth embodiment as a function of azimuthal angle φ in polar form, where φ is measured with respect to the strong or x-axis. The "average transmissivity" again refers to averaging the transmission for both orthogonal polarizations (s-pol and p-pol), for each calculated datapoint. Curve 720 is for θ=40 degrees, curve 722 is for θ=50 degrees, curve 724 is for θ=60 degrees, and curve 726 is for θ=70 degrees. This same transmissivity data is plotted in Cartesian form in FIG. 7b. In that figure, curve 730 is for θ=0 degrees, curve 732 is for θ=30 degrees, curve 734 is for θ=40 degrees, curve 736 is for θ=50 degrees, curve 738 is for θ=60 degrees, and curve 740 is for θ=70 degrees.

Figure 5B:
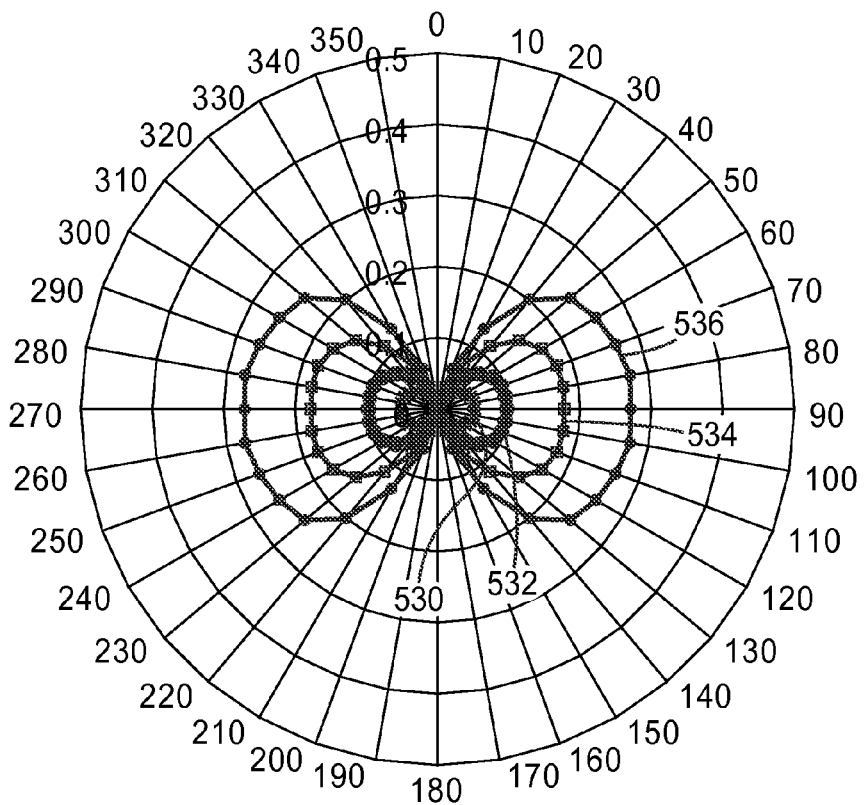

Comparing FIGS. 5b and 7a, or comparing FIGS. 5a, 6c, 6d, and 7b, one can readily see that the first, fourth, fifth, and sixth embodiments all achieve substantial confinement or directionality of transmitted light in the azimuthal direction. The azimuthal collimation Δφe for these embodiments, calculated using the 1/e criterion described above, is as follows: 126 degrees (first embodiment); 142 degrees (fourth embodiment); 126 degrees (fifth embodiment); 80 degrees (sixth embodiment). The sixth embodiment clearly provides narrower azimuthal collimation or better directionality than the other embodiments.

Figure 8:
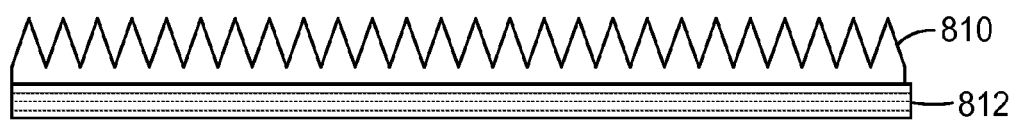
FIG. 8 is a schematic side view a multilayer optical film as disclosed herein in combination with a linear prismatic film, the prismatic film oriented to redirect highly oblique light exiting the multilayer film into other directions.

Whether wide or narrow, the degree of azimuthal collimation provided by these multilayer optical films can be used beneficially with linear prismatic structures in the construction of efficient light management film combinations. For example, a linear prismatic film 810 can be applied to a multilayer optical film 812 as disclosed herein to aid in directing the obliquely transmitted light to a substantially vertical direction, or to other directions as desired. Such an arrangement is shown in FIG. 8. The prism film can refract the oblique light rays toward the normal direction and can also compress the range of angles transmitted. By laminating the prism film 810 to the multilayer film 812, two polymer/air interfaces can be eliminated. For optimal efficiency, the weak axis of the multilayer film 812 is oriented to be perpendicular to the length axis of the prisms. Maintaining a narrow azimuthal collimation, as with the sixth embodiment, can provide for collimation about the z-axis in the x-z plane when used in combination with a prism structure.

The shape of the prism array may be very different than conventional BEF structures. With the disclosed multilayer optical films, the level of reflectivity provided for normal and near-normal incident light can be determined by the multilayer film, rather than by the prism array. The prism array may be used simply to redirect the light transmitted by the multilayer film at the high incidence angles ranging generally from 30 to 90 degrees. The included angle at the apex of the prisms can range from about 40 to almost 180 degrees, if desired. By comparison, conventional BEF film has included angles of about 90 degrees. For some systems, the multilayer film may deliver most light from about 50 to 80 degrees. The choice of included prism angle is dependent on the desired direction of the refracted light relative to the x-z plane. With no prisms (e.g. a 180 degree included angle), a wide angle batwing distribution is created by the multilayer film and light recycling cavity. If prisms are added above the film as in FIG. 8, the batwing lobes are directed toward the vertical (z-axis direction). The smaller the prism included angle (and the larger the prism index of refraction), the more the batwing lobes are refracted closer to the x-z plane. For large included angles, e.g. from about 90 to 180 degrees, useful variations of a batwing distribution can be made for luminaires in various lighting applications. For smaller included angles, from e.g. about 90 degrees to about 40 degrees, the batwing lobes are refracted closer to the x-z plane, resulting in a collimated output in the limit of small included angles. The actual prism angle for maximum collimation depends on the Brewster minimum angle of the film and on the prism index. Collimation in the y-z plane is dependent on the azimuthal collimation of the transmitted light Δφe, which is dependent on the multilayer film design.

Additional structure may also be added to some or all facets of the prisms. This additional structure may be diffractive or refractive. Diffusive particles may also be added to the bulk of the prism film. Alternatively, a completely diffractive film can be employed rather than a refractive prism film. The prisms of the prism film can all be the same shape and size or may vary from prism to prism in an orderly or random manner. The prism facets may include sub-structure, and they may also be curved, and the prism apexes may be rounded or flat.

Figure 9A:
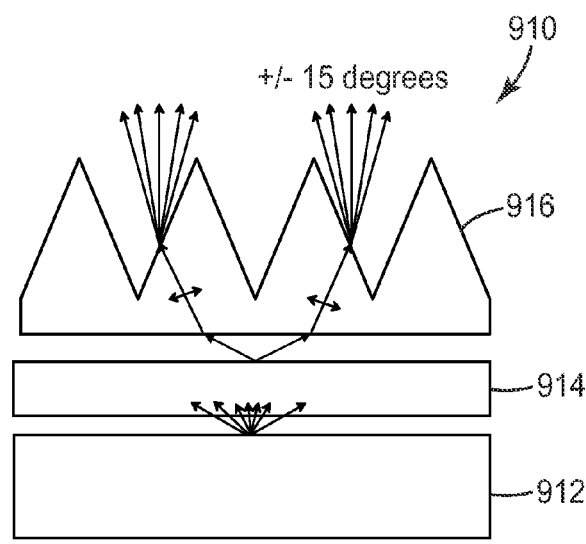
FIGS. 9a and 10a are schematic side views of different lighting systems, which include an extended light source, a multilayer optical film, and different prismatic films.
Figure 9B:
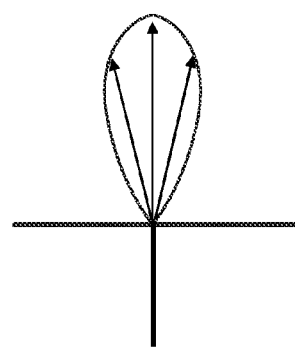
FIGS. 9b and 10b depict the respective resultant angular distribution of light output.

FIG. 9a shows in schematic side view a lighting system 910 comprising an extended light source 912 such as a solid or hollow light guide, emitting light in all directions or in selected directions. A multilayer optical film 914 as disclosed herein selectively transmits the light in the batwing distribution, reflecting other light back into the light source 912 for recycling. A prism film 916 directs the obliquely emitted light towards the normal direction in a narrow cone, e.g., +/−15 degrees. The resulting emitted light distribution, shown in FIG. 9b, is similar to a "spot light" distribution but is accomplished using a much thinner, lower profile physical structure.

Figure 10A:
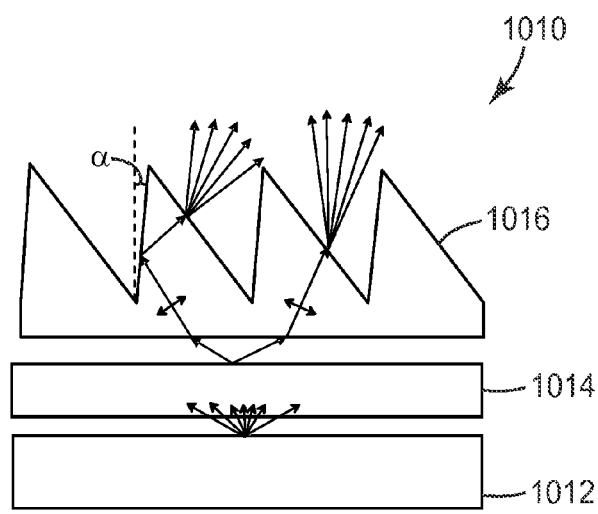
Figure 10B:
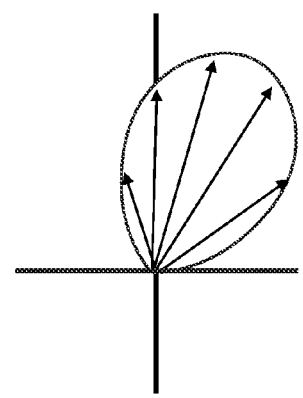

FIG. 10a shows a lighting system 1010 similar to the lighting system of FIG. 9a, where like reference numerals are used for like elements, but where the symmetric prism film 916 is replaced by an asymmetric prism film 1012. By appropriate design of the asymmetric prisms, most of the light can be directed off to one side, e.g., left or right, depending on the slant of the prisms. This effect results from the total internal reflection (TIR) of light that strikes the near-vertical face of the prisms, as illustrated in FIG. 10a. The general form of the resultant light distribution pattern is illustrated in FIG. 10b.

Figure 11:
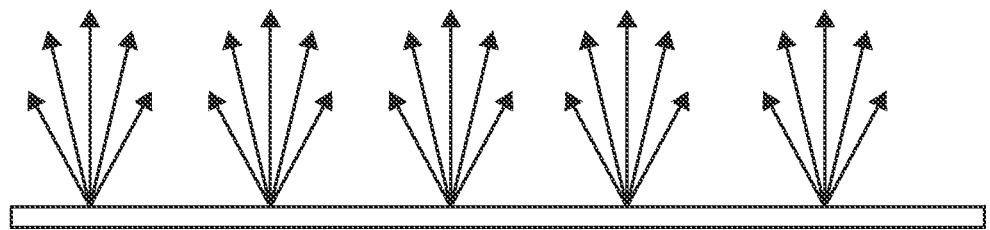
FIGS. 11 and 12 show schematic side views of different low profile lighting systems that can utilize the disclosed multilayer optical films.

The disclosed multilayer optical films can thus be combined with prismatic films, or with a similar prismatic surface coating, to make a thin, flat, and relatively well collimated lighting system, or alternatively a lighting system exhibiting a batwing distribution with the polar separation between opposite lobes of the batwing being selectable in a wide range from e.g. 160 degrees to 0 degrees. These systems can be edge lit with LEDs, or direct lit, and still provide a relatively uniform light output over the surface of the film. The lighting system can have directional properties similar to conventional spotlights, or even a flashlight, but have a form factor similar to a tablet notebook or a magazine. This form, and the resulting light ray pattern, is illustrated in FIG. 11.

A major difference between this collimated lighting system and a conventional collimated system is that the light emission from the surface of this system can be made to appear uniform, even though there may be only a few bright internal sources such as high brightness LEDs. In this manner a low glare, large area "spot light" with pleasing aesthetics and high lumen output can be made.

Figure 12:
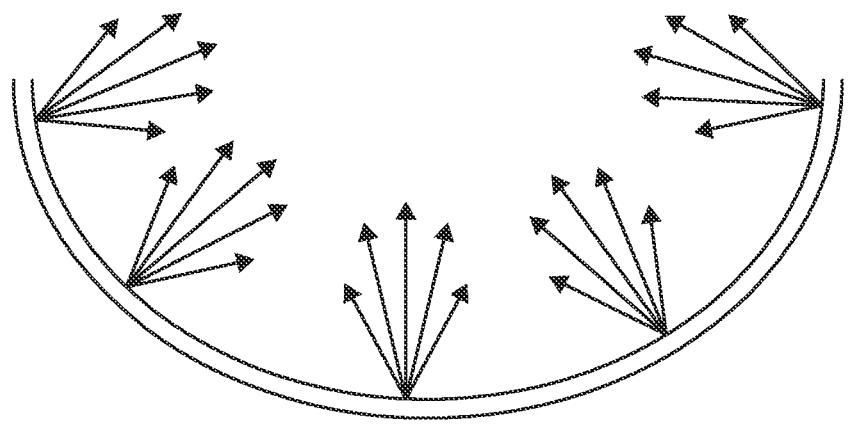

This structure can also be made in a curved form, such as the concave shape depicted in FIG. 12, or a convex shape such as where the structure is wrapped around a pillar of circular cross-section. The concave structure of FIG. 12 can have a light focusing property, which is difficult to attain with thin edge-lit luminaires of any other design.

Additional Discussion

The foregoing Brewster angle films can also be used in a variety of lighting systems, not limited to direct lit LCD backlights. Luminaires for room and space lighting, street lamps, backlit signage and other illumination purposes are contemplated. A lighting system as described herein may comprise several key elements listed here and described in more detail below:

1) one or more light sources and their placement (many examples above);
2) a light recycling cavity defined principally by
  (2a) a high efficiency back reflector, and
  (2b) a front partially transmissive reflector (e.g., one of the films described herein or incorporated by reference);
3) one or more diffusing elements (which can be a part of element 2, or separate) located between the front and back reflectors; and
4) a light redirecting layer located on the exit side of the front reflector.

Edges of the cavity can be designed to be part of either the front or back reflector, depending on the desired light output from the edges.

A key function of the recycling cavity and diffuser elements is to provide a uniform, or other designed flux of light to the input surface of the light redirecting layer. The light redirecting layer then provides the desired directionality to the light emitted by the system. The above four elements are available with a great variety of attributes which can be chosen in the appropriate combinations so as to solve a large variety of current needs in the lighting industry with respect to uniformity and directionality from thin, large area lighting systems. The relevant aspects of each component are discussed in more detail below.

1. Light Sources

The light sources can be placed on the edges, for edge lit systems, or placed in a direct lit manner as discussed above. Placement of the sources, and directionality of the light emission from the sources, and how it relates to the angular performance of the reflectors and diffusers in the system, can have a large impact on the efficiency and the uniformity of the lighting system.

Whether these characteristics can be successfully incorporated into a backlight depends in part on the type of light source used for illuminating the backlight. CCFLs, for example, provide white light emission over their long narrow emissive areas, and those emissive areas can also operate to scatter some light impinging on the CCFL, such as would occur in a recycling cavity. The typical emission from a CCFL however has an angular distribution that is substantially Lambertian, and this may be inefficient or otherwise undesirable in a given backlight design. Also, the emissive surface of a CCFL, although somewhat diffusely reflective, also typically has an absorptive loss that may be significant if a highly recycling cavity is desired. An LED die also emits light in a Lambertian manner, but because of its much smaller size relative to CCFLs, the LED light distribution can be readily modified e.g. with an integral encapsulant lens or reflector or extractor to make the resulting packaged LED a forward-emitter, a side-emitter, or other non-Lambertian profile. Such non-Lambertian profiles can provide important advantages for the disclosed backlights. However, the smaller size and higher intensity of LED sources relative to CCFLs can also make it more difficult to produce a spatially uniform backlight output area using LEDs. This is particularly true in cases where individual colored LEDs, such as arrangements of red/green/blue (RGB) LEDs, are used to produce white light, since failure to provide adequate lateral transport or mixing of such light can easily result in undesirable colored bands or areas. White light emitting LEDs, in which a phosphor is excited by a blue or UV-emitting LED die to produce intense white light from a small area or volume on the order of an LED die, can be used to reduce such color non-uniformity, but white LEDs currently are unable to provide LCD color gamuts as wide as those achievable with individual colored LED arrangements, and thus may not be desirable for all end-use applications. The phosphor based LEDs generally produce a Lambertian directional output. LEDs without phosphor are available with Lambertian, batwing, or side emitting profiles which can be used to optimize the performance of a system.

As an alternative to a phosphor LED, the phosphor layer can be coated on or otherwise attached to other elements within the cavity or on the exit side of the front reflector.

2. Light Recycling Cavity And Diffusers

An efficient light recycling cavity is intended to efficiently mix both the directionality and the polarization directions of light injected into or recycled within the cavity. This requires both low loss reflectors and light redirecting elements located between the two reflectors. In the recycling optical cavity, a large proportion of the light undergoes multiple reflections between substantially coextensive front and back reflectors before emerging from the front reflector, which is partially transmissive and partially reflective.

The front reflector has a high enough reflectivity for such useable light to support lateral transport or spreading of the light as required, and for light ray angle randomization to achieve acceptable spatial uniformity of the backlight output, but a high enough transmission into the appropriate application-useable angles to ensure application brightness of the lighting system is acceptable. Overall losses for light propagating in the recycling cavity are kept extraordinarily low, for example, both by providing a substantially enclosed cavity of low absorptive loss, including low loss front and back reflectors as well as side reflectors, and by keeping losses associated with the light sources very low, for example, by ensuring the cumulative emitting area of all the light sources is a small fraction of the backlight output area.

There may be instances where Lambertian emitting LEDs are preferred in a direct-lit backlight for reasons of manufacturing cost or efficiency. Individual light deflection devices may not be preferred for similar reasons. Good uniformity and the reduction of "punchthrough" may still be achieved with the use of the films described herein. If the front reflector is highly reflective, e.g., having less than about 10% or less than 5% transmission at normal incidence, then the LED will be less visible when the system is viewed at normal incidence. Although the films described herein may have higher transmission at oblique angles, the intensity of the light from a given point source such as an LED will decrease with a $1/R^2$ value where R is the distance from the LED to a point on the front reflector. Thus when viewed at oblique angles, the punchthrough is reduced by this distance factor in the intensity. When combined with a partial reflectivity of the film even at oblique angles, the punchthrough is even more reduced. In addition the light that is rejected at normal angles, when scattered by the appropriate diffusing elements as described below, is distributed to further increase the uniformity of the system.

3. Diffusing Elements

The recycling optical cavity contains a component or components that provide the cavity with a balance of specular and diffuse characteristics, the component having sufficient specularity to support the desired degree of lateral light transport, but also having sufficient diffusivity to substantially provide the desired the angular and spatial distribution of steady state light within the cavity. For polarized lighting systems, recycling within the cavity preferably includes a degree of randomization of reflected light polarization relative to the incident light polarization state, which allows a mechanism by which non-useable polarized light is converted into useable polarized light. The combination of the front and back reflectors and the diffusing elements create a light guide that controls the transport of light from the individual light sources to the surface of the front reflector. The mechanisms that control this process are now discussed.

Figure 13:
FIG. 13 is a schematic cross-section view of a portion of one embodiment of a backlight that includes a diffusely reflective front reflector and a diffusely reflective back reflector.

A pure specular reflector, sometimes referred to as a mirror, performs according to the optical rule that states, "the angle of incidence equals the angle of reflection". A hollow cavity design having the front and back reflector both purely specular provides maximum lateral transport of the light across the cavity, since the recycled ray is unimpeded in its lateral transit of the cavity. However, no angular mixing occurs in the cavity, since there is no mechanism to convert light propagating at a given incidence angle to other incidence angles. A purely Lambertian reflector, on the other hand, redirects light rays equally in all directions. This is seen in the hollow cavity design of FIG. 13, where the front and back reflector are both purely Lambertian. The same initially launched oblique light ray is immediately scattered in all directions by the front reflector, most of the scattered light being reflected back into the cavity but some being transmitted through the front reflector. Some of the reflected light travels "forward" (generally to the right as seen in the figure), but an equal amount travels "backward" (generally to the left). By forward scattering, we refer to the lateral or in-plane (in a plane parallel to the scattering surface in question) propagation components of the reflected light. When repeated, this process greatly diminishes the forward directed component of a light ray after several reflections. The beam is rapidly dispersed, producing a greatly reduced lateral transport compared to a specular system.

A semi-specular reflector provides a balance of specular and diffusive properties. In the hollow cavity design of FIG. 14, the front reflector is purely specular but the back reflector is semi-specular. The reflected portion of the same initially launched oblique light ray strikes the back reflector, and is substantially forward-scattered in a controlled amount. The reflected cone of light is then partially transmitted but mostly reflected (specularly) back to the back reflector, all while still propagating to a great extent in the "forward" direction.

Semi-specular reflectors can thus be seen to promote the lateral spreading of light across the recycling cavity, while still providing adequate mixing of light ray directions and polarization. Reflectors that are partially diffuse but that have a substantially forward directed component will transport more light across a greater distance with fewer total reflections of the light rays. In a qualitative way, we can describe a semi-specular reflector as one that provides substantially more forward scattering than reverse scattering. A semi-specular diffuser can be defined as one that does not reverse the normal component of the ray direction for a substantial majority of the incident light, i.e. the light is substantially transmitted in the forward (z) direction and scattered to some degree in the x and y directions. A more quantitative description of semi-specular is given in commonly assigned PCT Application Publication No. WO 2008/144644, "Recycling Backlights With Semi-Specular Components", filed May 19, 2008.

Figure 14:
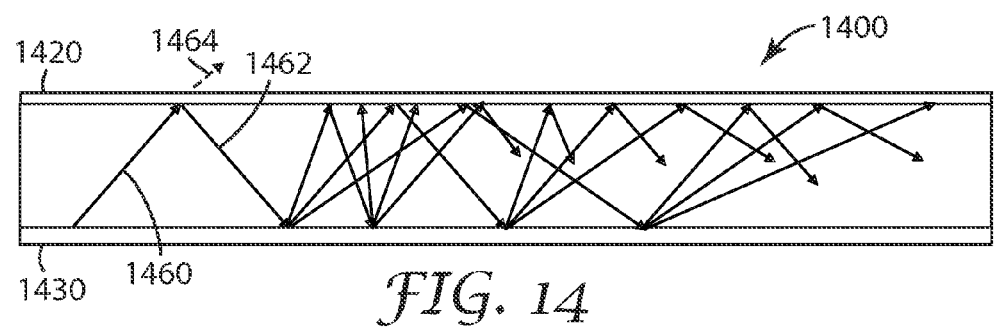
FIG. 14 is a schematic cross-section view of a portion of one embodiment of a backlight that includes a specularly reflective front reflector and a semi-specular back reflector.

As an alternative to the two-component systems of FIG. 14, additional optical components can be inserted into the recycling cavity between the front and back reflectors, and such additional components may be tailored to provide the desired degree of semi-specularity to the cavity. Although it is often desirable to minimize the number of components in the cavity, the use of a third component can sometimes provide a higher efficiency cavity by allowing for the minimal loss design of the front or back reflector.

The mixing of light rays in the cavity with scattering elements can be accomplished in several ways. It can be done by diffusing elements that are either an integral part of the front or back reflector or are laminated to the front or back reflector, or by use of a separate diffusing sheet placed anywhere between the two. Combinations of any of these options are also possible. The choices depend on the relative importance of matters such as optical losses, component cost, and convenience of manufacturing. The diffusing element may be attached to or an integral part of either the front or back reflector, or an air gap may be provided between the diffuser and the reflectors.

Whether the diffuser is an integral part of either reflector, or laminated to either reflector, or placed in the cavity as a separate component, the overall desired optical performance is one of controlling the angular spreading function for a ray that completes one round trip passage from the back reflector to the front and back again. A semi-specular reflector can have characteristics of both a specular and a Lambertian reflector or can be a well defined Gaussian cone about the specular direction. Alternatively, a diffuser can have significant back-scattering properties such as for a retro-reflective film or coating. Keeping in mind that the diffuser component can also be separate from the reflector, several possible constructions exist to create the back reflector with controlled degree of diffusion:

(1) partial transmitting specular reflector on a high reflectance diffuse back reflector;

(2) partial Lambertian diffuser covering a high reflectance specular back reflector;

(3) forward scattering diffuser on a high reflectance specular back reflector;

(4) partial retroreflecting coating on a specular back reflector;

(5) corrugated high reflectance specular reflector;

(6) diffuse reflector.

For each construction, the first element listed is arranged to be facing inside the cavity. The first elements of constructions (1) through (4) can be continuous or discontinuous over the area of the back reflector. In addition, the first element could have a gradation of diffuser properties, or could be printed or coated with additional diffuser patterns that are graded. The graded diffuser is optional, but may be desirable to optimize the efficiency of various backlight systems. The term "partial Lambertian" refers to an element that only scatters some of the incident light. The fraction of light that is scattered by such an element is directed almost uniformly in all directions. In construction (1), the partial specular reflector is a different component than that utilized for the front reflector. The partial reflector in this case can be either a spatially uniform film of moderate reflectivity, or it can be a spatially non-uniform reflector such as a perforated multilayer or metallic reflector. The degree of specularity can be adjusted either by changing the size and number of the perforations, or by changing the base reflectivity of the film, or both.

Construction (5) can be made by thermally embossing a multilayer polymeric mirror film, or by physically corrugating such a film. Additionally, any surface with these shapes can be coated with a metallic or enhanced metal reflective film. Furthermore, the semi-specular constructions of (1) through (4) can be corrugated or embossed in order to optimize their light transport properties.

Some of these combinations are also possible for the front (partial) reflector, such as the diffuse element in (2), (3), (4), and (5), or any combination thereof with any of the front reflectors of this invention. Again, the first element listed is arranged to be inside the recycling cavity. The first element of all three constructions can be continuous or discontinuous over the area of the partial reflector, and the first element can have a gradation of diffuser properties, or can be printed or coated with additional diffuser patterns that are graded.

Quantitatively, the degree of semi-specularity (specular vs. Lambertian vs. retro-reflecting characteristic of a given reflector or other component) can be effectively characterized by comparing the fluxes of the forward- and back-scattered light components, referred to as F and B respectively. The forward and back-scattered fluxes can be obtained from the integrated reflection intensities (or integrated transmission intensities in the case of optically transmissive components) over all solid angles. The degree of semi-specularity can then be characterized by a "transport ratio" T, given by:

$$T=(F-B)/(F+B).$$

T ranges from −1 to 1 as one moves from purely retro-reflection to pure specular reflection. With a perfect retro-reflector, all light is backscattered, giving F=0 and B=1. For a pure Lambertian reflector, the forward- and back-scattered fluxes are the same (F=B), and thus T=0. For a pure specular reflector there is no back-scatter (B=0), and therefore T=F/F=1. Examples with experimentally measured values are given in commonly assigned PCT Application Publication No. WO 2008/144644, "Recycling Backlights With Semi-Specular Components",filed May 19, 2008. The transport ratio for any real reflective or transmissive component is a function of incidence angle. This is logical, because one would expect the amount of forward-scattered light, for example, to be different for a near-normally incident ray than for a grazing-incident ray.

Characterization of a diffuse reflector can be made with an Autronics Conoscope, available from autronic-MELCHERS GmbH, Germany, in the reflectance mode. The sample is placed about 2 mm from the conoscope lens, at the focal point. The sample is illuminated by the instrument with white collimated light with a chosen angle of incidence. The light reflected from the sample is collected by the conoscope lens and imaged onto a two dimensional detector array (CCD camera). This image is transformed into an angular distribution function using the calibration file. The instrument provides a very useful comparison of the angular reflection properties of various semi-specular and diffuse reflectors. A significant specular component of a reflector can result in saturation of the detector near the specular angle, but this value can be measured separately on a machine setting of lower sensitivity.

The transport ratio is well defined for a single interaction of a light ray at one angle with a reflector or a diffuser. A good recycling cavity creates multiple interactions of a light ray at all angles with at least two reflecting or diffusing components, and perhaps three or more such components. Since the transport ratio for a single interaction is a function of the angle of incidence, the description of an overall cavity transport ratio is therefore more complex than for a single component. An "effective cavity transport ratio" or more descriptively a "cavity transport value", should be a measure of how well a cavity can spread injected light from the injection point to distant points in the cavity and still randomize it sufficiently to direct light uniformly towards a user. A simple method of estimating relative cavity transport values is useful for judging the comparative merits of various combinations of specular, semi-specular, and Lambertian components. For this purpose we define the forward transport number fT for each component, expressed as:

$$fT=F/(F+B)$$

where F and B are defined and measured as described herein but now averaged over all angles of a single interaction. Measurements at intervals of about 10 degrees from 10 to 80 degrees is sufficient to give a proper average. F and B are the relative fractions of forward and backscattered light and by definition, F+B=1, giving simply fT=F which is the fraction of forward scattered light. The cavity transport CT is then the product of the F values of the front and back reflector of the cavity:

$$CT=F_{front}*F_{back}$$

For example, if the front reflector is specular, having $F_{front}=1$ and a semi-specular back reflector with $F_{back}=0.75$ (transport ratio T=0.5) then the overall cavity transport value is given by CT=1*0.75=0.75.

With most common diffusers, T ranges between 0 and 1 as described above and fT ranges from 0.5 to 1.0. However, if a material which possesses some retro reflecting property is utilized as a diffuser, T can be negative and can range from 0 to −1 for such a material and F will range from 0 to 0.5. Retro-reflecting glass beads are an example, as are prismatic structures with 90 degree, or near 90 degree, angled facets.

As another example, if the front reflector is Lambertian so that $F_{front}=0.5$ (T=0) and the back reflector is semi-specular so that $F_{back}=0.75$ (T=0.5), then the overall cavity transport value is CT=0.5*0.75=0.375. One would expect the latter cavity to transport much less light to a given distance from the injection point than the first example cavity. This prediction is confirmed by experiment as described herein.

For some applications, the front reflector may consist of a stack of several components, such as a specular or a semi-specular reflector followed by a light redirecting layer or one or more diffusers that may or may not be laminated to each other. The front and back reflectors each can be defined as a collection of components assembled in a specific order. The collective transport properties of all components that make up the front reflector or the back reflector can be determined with one measurement. The effect of an individual component (e.g., a film) on the transport properties of a stack of components depends on the component's sequence and orientation in the stack and the properties of the other components in the stack. For at least these reasons, the stack can be measured as a whole. The components of the front reflector can be placed in the measuring device, such as the ones made by Autronics and by Radiant Imaging (Duvall, Wash., USA), with the inside cavity surface facing the measuring light beam.

The measurement of F and B described above for semi-specular reflectors is done in reflection mode, which means that portions of the incident beam pass through the diffuse layer twice or reflect from it once. If the diffuser were an intermediate component positioned somewhere in the cavity between the front and back reflectors, then light rays pass through it twice in making one front to back cycle during the transport process. For this reason, we define the F and B values of an intermediate component as those measured in the same manner as a diffuser coated on a mirror. The intermediate component can be grouped with either the front or the back reflector, and the combined transport properties of the intermediate component and the chosen reflector can be measured together. If the majority of the light is injected into the cavity above an intermediate component (or though-holes in it from below), then the intermediate component can be grouped with the bottom reflector. If the majority of light is injected below an intermediate component, then the intermediate component can be grouped with the front reflector for transport measurement.

4. The Light Redirecting Layer

When the disclosed films are utilized as the front reflector in a light cavity, the light redirecting layer receives the light flux from the cavity. The light flux incident on the redirecting layer will have angular distributions that are centered around predetermined values of $\theta_0$ and $\phi_0$, the polar and azimuthal angles of maximum light transmission of the film. The angle ranges $\Delta\theta$ and $\Delta\phi$, given by $\Delta\theta e$ and $\Delta\phi e$, allow for the design of microstructures that can efficiently redirect most of the light into a desired range of angles. The light redirecting layer can be a bulk diffuser for Lambertian output or prismatic or holographic structures for specific angle control.

In order to redirect the light which exits the recycling cavity, certain structured forms can be placed on or above the surface of the front reflector from which the light exits. These structures can be prismatic, or can be spherical or partial spheres or other regular or irregular shapes. The structures can also be controlled in size so as to either refract light or to diffract light, or combinations of both. The degree of directional symmetry of the multilayer optical films with respect to the transmission of light incident in different planes may determine whether a one-dimensional or a two dimensional structure is added to the multilayer film to redirect the transmitted light. Some films transmit substantially along only one axis of the film, i.e. they create a substantially narrow cone of directional light. These "1D" reflectors can more effectively utilize 1D, e.g. linear, surface structures wherein the linear structures are placed at an angle to the major plane of transmission, typically perpendicular to this transmission axis. Other films can transmit over a broader angular range and can better utilize a two dimensional structure to redirect the light.

A combination of the films and the microstructures described above can be used in a lighting system to provide various degrees of collimation of substantially random directional light. Compressing the angular range of light exiting a backlight is difficult when the source light is highly random, or Lambertian, a condition which is often required for uniformity.

Two dimensional structures can be either random or ordered arrays. Two dimensional structures such as an array of beads, spheres, pyramids, etc. can be used on both symmetrical and asymmetrical reflectors. They can be either preformed structures that are coated on with a binder, or can be embossed, i.e., replicated by thermal embossing of a solid surface layer or by a cast and cure process or by extrusion melt coating and embossing. The structures can be close packed or spaced apart. Alternatively, a film containing such surface structures can be laminated.

The 2D structures can be rounded or pyramidal, or combinations of both. A particularly useful structure is a rounded conical structure similar to a "nose cone". This structure reduces the flat area which occurs on the tops of spherical structures. The individual elements can be solids of revolution or can be multi-faceted.

The degree of collimation of the light exiting the cavity is dependent on the shape of the structure, the shape being generally characterized by the distribution of surface normal vectors to the surface.

The structure disclosed by in U.S. Pat. No. 3,829,680 (Jones) which is used for creating a batwing distribution can be used in conjunction with the disclosed films and combinations to modify their batwing distribution. This structure creates the batwing distribution by retro-reflecting a range of light rays that strike the exit plane near normal incidence. Such a structure will work well with the disclosed films because they already block most of those near normal rays, and deliver more of the higher angle rays which are then bent closer to the normal by the structured surface. In this manner, the maximum output angle of the films (near 60 or 70 degrees) can be redirected to smaller angles. However, since the multilayer films can block the near normal rays, the microstructure no longer needs to be retro-reflecting and can be modified from that of Jones to enhance the angle of refraction of the more oblique rays.

In general, optical elements such as the multilayer films described herein which selectively transmit light over a limited range of hemispherical angles are useful for enhancing the performance of misconstrued light redirecting layers. Structured surfaces have limited utility in controlling the directionality of light from a Lambertian source. However, the films here transmit only a selected portion of the Lambertian distribution, enabling the design of specialized surface structures that can more effectively redirect that light.

An exemplary structure is one with a distribution of surface normals that will refract the high angle rays transmitted by the multilayer film to angles closer to the normal. Instead of only one surface normal angle, the prism facet is represented by a continuous range of surface normals. This structure could be either a linear array of prisms having curved facets, or could be rotationally symmetric structures such as the "nose cone" structure, or they could be elongated 2D structures.

Lighting Systems

Figure 15:
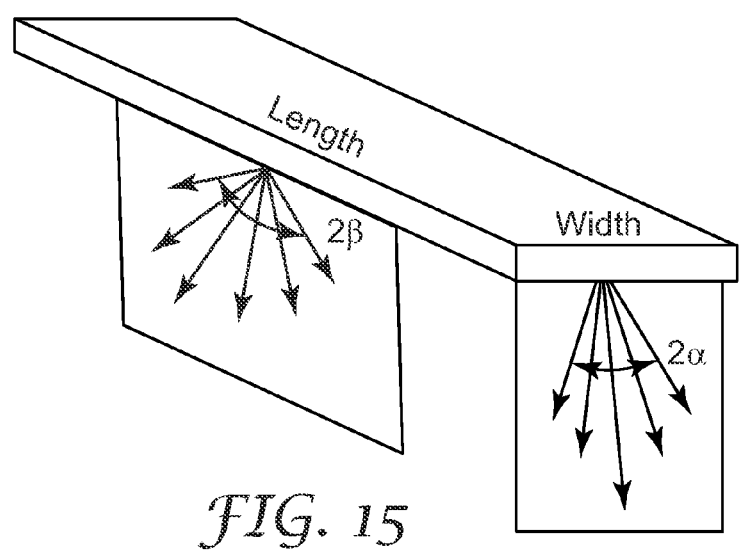
FIG. 15 is a perspective view of a luminaire having different output divergence or collimation in orthogonal planes.

A schematic of an exemplary lighting system is shown in FIG. 15. Using the principles outlined above, a thin, large area efficient lighting system can be constructed having designed collimated light output angle distributions $2\alpha$ and $2\beta$. The angles $\alpha$ and $\beta$ can be derived from the basic film characteristic output angles $\Delta\theta e$ and $\Delta\phi e$ respectively and the light redirecting layer can be designed by the uses of standard optical design and ray tracing tools. The light distributions $2\alpha$ and $2\beta$ are defined as the range of angles over which the light intensity falls to $1/e$ of the central value. If $2\alpha$ is the angle range determined by $\theta e$ and the microstructure, it can be as large as 180 degrees, or as narrow 20 degrees. Intermediate values of 30, 45, 60, 90 and 120 degrees are also readily achieved. If 2β is the angle range determined by the azimuthal range Δφe and the microstructure, it can be as large as 180 degrees or as small as 45 degrees. Intermediate values of 60, 90, and 120 degrees are also readily achieved. The principal axes of the multilayer film and the prisms can be oriented at any angle with respect to the edge of a luminaire or other lighting device. In FIG. 15, the axes are aligned for illustrative purposes only. In addition to a rectilinear shape, the lighting system can be any shape. The profile can be very thin, although thick (deep) cavities are easily constructed as well.

The lighting systems can be edge lit, direct lit, or a combination of both.

The front reflector can be attached to the light redirecting layer, or both can be attached to a plate such as a glass or rigid polymer plate. The glass or plate can be a component of another system, typically the system to be illuminated by the lighting system. An example is an LCD panel.

Direct Lit Hollow Lighting System with Bulb Hiding and Zone Control

For enhanced light transport in an edge lit hollow cavity light system, the cavity transport ratio CT and thus the forward transport ratios fT of the front and back reflectors are chosen for high values of light transport in order to spread light efficiently across large distances in the cavity in order to promote uniformity. However, in the case of direct lit zoned backlights for LCDs, there is a need to limit the range of light spreading from a given small area source, as for example, from one or a few LEDs in a localized lighting zone. However, the uniformity within a zone must still be created by some means and both the cost and ease of manufacturing are major considerations. For these latter reasons, it is desirable to confine the light from a given local source without the use of walls or other reflective barriers between the various zones in the system.

To accomplish both uniformity and limited light spreading within an open system, several components should be used concurrently. These components are:

(1) an angle selective partially transmitting reflector on the front plate;

(2) a diffusing component;

(3) front and back reflectors which combine to give a low or a negative cavity transport ratio;

(4) a localized light source with an emission pattern chosen to compliment the angle selection of the front reflector; and (5) a light redirecting layer.

In addition, both the front reflector and the back reflector should have high efficiency to provide for low loss in a highly recycling cavity.

These components are discussed in some detail above. The first component can be the angle selective reflectors this invention. For a two dimensional (2D) array of small area light sources, a reflector having a Brewster angle of less than 90 degrees in air along both orthogonal in-plane axes may be chosen if transmission of light is desired in both in-plane directions of the system. For a 1D array of sources (e.g. fluorescent bulbs or e.g. a lineal array of LEDs), an azimuthly selective reflector may be chosen, again with at least one axis having a Brewster angle of less than 90 degrees in air. Bulb hiding is a primary concern in direct lit systems. To reduce or eliminate the visibility (punch through) of bright, small-area sources the front reflector can be chosen to have high reflectivity at normal incidence, with gradual increase in transmissivity as the angle of incidence increases. $R_{normal}$ can be greater than 80%, greater than 90% or greater than 95%. If a small area source has a modified output distribution that greatly reduces the amount of vertically emitted light, then the top reflector can be chosen to have a reflectivity vs. angle that is flat or increases with angle of incidence, provided it has an overall $T_{Hemi}$ that is low enough to provide for substantial recycling of the light. $T_{Hemi}$'s of 30%, 20%, 10% and even 5% are useful for this purpose. Front reflectors with significant Brewster minima in reflection are useful, even if the Brewster angle is greater than 90 degrees in air. However, the reflectivity at the Brewster minimum should be at about 50% or less than the reflectivity at normal incidence. The first component can be laminated to a rigid plate, which may be a part of another system, such as an LCD panel.

Components (2) and (3) are discussed above with respect to cavity transport. The lower the cavity transport ratio the more reflections are required for the light to spread away from a point source. Such a system, when supplied with a significant diffusion mechanism, will provide mixing via multiple reflections of the light, but substantial portions of the light will reflect back and forth within a local geometry as the light slowly exists the top plate. However, any coating that is placed on the front reflector to modify its specular properties should not grossly interfere with its angle selective reflection properties. Alternatively, a light scattering layer with chosen transport ratio can be placed against the front reflector with an air gap. If the back reflector is highly retro-reflecting to the point of sending all of the light directly back into the source, then some diffusion may desirably be added in order to spread the light so most of it does not return to the source where it can be absorbed. The action of the retro-reflector in combination with a top specular or semi-specular reflector for confining light to a zone is to repeatedly send light away from and then back towards any of the local light sources in the cavity. With common retro-reflectors such as high index glass beads, a substantial amount of diffusion will occur, providing for a more uniform distribution of light in the area near the source as a result of the repeated reflections.

Diffuse reflectors, or separate diffusers with transport ratios of 0.25 or less are useful for this application. Diffuse components with T less than 0.1 or less than 0 are desirable. Cavity transport values of CT<0.5 are desirable. For increased light confinement, cavity transport values of CT<0.3 or even <0.2 may be used.

The fourth component, the small area light source, should have a tailored emission pattern which is optionally selected to compliment the angular transmission characteristics of the angle selective reflector on the front plate as discussed above. The small area source should not have a lateral emission pattern that would direct substantial amounts of the light parallel to the front or back reflector. Such emitted light would travel large distances and escape the local zone. The light source could optionally have an asymmetric azimuthal output, and, say, emit to one side only.

For enhanced uniformity it is possible for one or more sources to be within the zone of influence of an individual LED. Depending on system design criteria, it may be desirable to have a little or a large degree of overlap between zones of influence of neighboring LEDs. For example, having low overlap provides the ability to significantly dim a portion of the display. This provides advantages of maximizing contrast and energy savings in zoned systems however it also makes the system vulnerable to failure of an individual LED. It may indeed be desirable for some systems to intentionally have overlapping zones of influence so as to achieve a more favorable balance of system robustness with still useful levels of power savings and contrast.

A zone of influence may be considered to be the area over which the light intensity of a local source (i.e. a single LED, or a local cluster of LEDs) falls to 1/e of the intensity at the center of the zone. (Cluster=a number of LEDs that are mounted on the same chip or heat sink and are within a few mm of each other.) The zone of influence of a local source may overlap the nearest neighbor zones or the second nearest neighbors, or even the third nearest neighbors, depending on the degree of uniformity and the required zone sizes. The local sources can be arranged in linear, square, rectangular, hexagonal, or other patterns, including a random array.

It would be desirable to have one or more optical sensors to detect the output at a particular point in the backlight and through feedback circuit adjust the output of the individual LEDs according to a control scheme.

Though a spatially invariant solution is preferable, it would be possible to have a spatially variant solution and, for example, have printed diffusing or reflective dots or patches directly above each source to help reduce the "punch through".

Unless otherwise indicated, all numbers expressing quantities, measurement of properties and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the scope and spirit of this invention, and it should be understood that this invention is not limited to the illustrative embodiments set forth herein. All U.S. patents, patent application publications, and other patent and non-patent documents referred to herein are incorporated by reference, to the extent they are not inconsistent with the foregoing disclosure.

The invention claimed is:

1. A reflective film having substantially flat outer surfaces, comprising:
a plurality of microlayers arranged into optical repeat units for reflecting light over an extended wavelength band, adjacent microlayers exhibiting substantial in-plane refractive index mismatches $\Delta nx$ along an x-axis and $\Delta ny$ along a y-axis, such that for normally incident light in the extended wavelength band, the film has a reflectivity Rnormalx for such light polarized along the x-axis and a reflectivity Rnormaly for such light polarized along the y-axis, Rnormalx and Rnormaly both being at least 75%;
wherein adjacent microlayers also exhibit a substantial refractive index mismatch $\Delta nz$ along an out-of-plane z-axis, such that for light in the extended wavelength band incident on the film in a first plane of incidence, the film has a reflectivity R1 of no more than half of Rnormalmin for such light that is p-polarized and incident at an angle $\theta$oblique, where Rnormalmin is the lesser of Rnormalx and Rnormaly; and
wherein $\Delta nx$ and $\Delta ny$ are different enough so that for light in the extended wavelength band incident on the film in a second plane of incidence orthogonal to the first plane, the film has a reflectivity R2 of at least 75% for such light that is p-polarized, for all angles of incidence.

2. The film of claim 1, wherein Rnormalx, Rnormaly, Rnormalmin, R1, and R2 each include effects of two film/air interfaces.

3. The film of claim 1, wherein Rnormalx, Rnormaly, Rnormalmin, R1, and R2 each include no effects of any film/air interface.

4. The film of claim 1, wherein the extended wavelength band includes the visible spectrum from 400 to 700 nm, and wherein Rnormalx, Rnormaly, Rnormalmin, R1, and R2 are each averages over the visible spectrum.

5. The film of claim 1, wherein the film exhibits a transmission as a function of angle for light in the extended wavelength band characterized by two transmission lobes, each lobe having an angular width $\Delta\theta e$ in polar angle $\theta$ and an angular width $\Delta\phi e$ in azimuthal angle $\phi$.

6. The film of claim 5, wherein $\Delta\phi e$ is a full angular width at half-maximum transmission (FWHM), and is no more than 140 degrees.

7. The film of claim 6, wherein $\Delta\phi e$ is no more than 130 degrees.

8. The film of claim 6, wherein $\Delta\phi e$ is no more than 80 degrees.

9. The film of claim 1, wherein $\Delta nx$ and $\Delta ny$ are of opposite sign.

10. The film of claim 1, wherein each optical repeat unit includes a first microlayer composed of a negatively birefringent material and a second microlayer composed of a positively birefringent material.

11. The film of claim 1, wherein the film exhibits an internal Brewster angle in the first plane of incidence but exhibits no internal Brewster angle in the second plane of incidence.

12. The film of claim 1, wherein $\Delta nx$ and $\Delta ny$ are of the same sign.

13. The film of claim 1, wherein the film exhibits internal Brewster angles in both the first and second planes of incidence.

14. A lighting system comprising the reflective film of claim 1.

15. The system of claim 14, further comprising:
a back reflector disposed to form a recycling cavity with the reflective film.

16. The system of claim 14, further comprising:
a light source extending along a length axis and disposed behind the reflective film;
wherein the reflective film is oriented such that the length axis is substantially perpendicular to the first plane of incidence.

17. The reflective film of claim 1 in combination with a diffuser.

18. The combination of claim 17, wherein the reflective film attaches to the diffuser with no intervening air gap.

19. The combination of claim 17, wherein the diffuser substantially scrambles polarization.

20. The combination of claim 17, wherein the diffuser comprises a volume diffuser.

21. The reflective film of claim 1 in combination with a linear prismatic film coupled to the film, wherein the prisms extend parallel to a prism axis, and wherein the prism axis of the prismatic film is substantially perpendicular to the first plane of incidence of the reflective film.

* * * * *